Nov. 10, 1964 H. C. A. VAN DUUREN ETAL 3,156,767

SYSTEM FOR ESTABLISHING AND MAINTAINING SYNCHRONISM IN DUPLEX TELEGRAPH SYSTEMS

Filed Jan. 8, 1960 11 Sheets-Sheet 1

TRANSMITTED

| Z | | Z | | Z | | Z | |
|---|---|---|---|---|---|---|---|
| 1 | NORMAL | 4 | INVERTED | 3 | INVERTED | 2 | NORMAL |
| 2 | NORMAL | 1 | NORMAL | 1 | INVERTED | 4 | INVERTED |
| 3 | INVERTED | 2 | NORMAL | 1 | NORMAL | 4 | INVERTED |
| 4 | INVERTED | 3 | INVERTED | 3 | NORMAL | 2 | NORMAL |

FIG. 1a.

| TRANSMITTED | RECEIVED | | | | | | | |
|---|---|---|---|---|---|---|---|---|
| Z | 0 | | 0 | | 0 | | 0 | |
| NORMAL | 1 | NORMAL | 4 | INVERTED | 3 | INVERTED | 2 | NORMAL |
| NORMAL | 2 | NORMAL | 1 | NORMAL | 1 | INVERTED | 4 | INVERTED |
| INVERTED | 3 | INVERTED | 2 | NORMAL | 1 | NORMAL | 4 | INVERTED |
| INVERTED | 4 | INVERTED | 3 | INVERTED | 3 | NORMAL | 2 | NORMAL |

FIG. 1b.

| | | | | | | | |
|---|---|---|---|---|---|---|---|
| I | O | X | O | X | X | O | O |
| α | X | X | O | O | O | X | O |
| β | O | X | X | O | O | O | X |

FIG. 1c.

INVENTORS:
H. C. A. Van Duuren,
C. J. Van Dalen,
H. DaSilva,
BY Hugh Adam Kirk
ATT'Y.

INVENTORS:
H. C. A. Van Duuren,
C. J. Van Dalen,
H. Da Silva,
BY Hugh A. Kirk
ATT'Y.

INVENTORS:
H. C. A. Van Duuren,
C. J. Van Dalen,
H. DaSilva,
BY
Hugh A. Kirk
ATT'Y.

Nov. 10, 1964 H. C. A. VAN DUUREN ETAL 3,156,767

SYSTEM FOR ESTABLISHING AND MAINTAINING SYNCHRONISM IN DUPLEX TELEGRAPH SYSTEMS

Filed Jan. 8, 1960 11 Sheets-Sheet 4

INVENTORS:
H. C. A. Van Duuren,
C. J. Van Dalen,
H. DaSilva.
BY [signature]
ATT'Y.

INVENTORS:
H. C. A. Van Duuren,
C. J. Van Dalen,
H. DaSilva,
BY Hugh A. Kirk
ATT'Y.

INVENTORS:
H. C. A. Van Duuren,
C. J. Van Dalen,
H. DaSilva,
BY Hugh A. Kirk
ATT'Y.

INVENTORS:
H. C. A. Van Duuren,
C. J. Van Dalen,
BY H. Da Silva.
Hugh A. Kirk
ATT'Y.

INVENTORS:
H. C. A. Van Duuren,
C. J. Van Dalen,
BY H. Da Silva,
Hugh A. Kirk
ATT'Y.

INVENTORS:
H. C. A. Van Duuren,
C. J. Van Dalen,
BY H. DaSilva
Hugh A. Kirk
ATT'Y.

INVENTORS:
H. C. A. Van Duuren,
C. J. Van Dalen,
BY H. DaSilva.
[signature]
ATT'Y.

INVENTORS:
H. C. A. Van Duuren,
C. J. Van Dalen,
BY H. DaSilva.
ATT'Y.

United States Patent Office 3,156,767

Patented Nov. 10, 1964

3,156,767

SYSTEM FOR ESTABLISHING AND MAINTAINING SYNCHRONISM IN DUPLEX TELEGRAPH SYSTEMS

Hendrik Cornelis Anthony van Duuren, Wassenaar, Christiaan Johannes van Dalen, Leidschendam, and Herman de Silva, Voorburg, Netherlands, assignors to De Staat der Nederlanden, ten deze Vertegenwoordigd door de Directeur-Generaal der Posterijen, Telegrafie en Telefonie, The Hague, Netherlands Filed Jan. 8, 1960, Ser. No. 1,313
Claims priority, application Netherlands Jan. 19, 1959
41 Claims. (Cl. 178—58)

The invention relates to a method and equipment for establishing and maintaining synchronism in duplex telegraph systems, particularly of the type-printing kind, together with error detection and automatic repetition.

Previously for example, systems of 35 signals of a protected seven-unit code have been available for the transmission of traffic signals and service signals. The object aimed at has been reached by a multiple use of the service signals used in older systems for signaling a mutilated signal and which has no effect on the receiving teleprinter. For example, one such system is described in Van Duuren U.S. Patent No. 2,703,361, issued March 1, 1955. There is described therein protected signals which protection is effected by sending all the signals with a constant ratio of marking and spacing elements. On reception each signal is checked as regards to this mark-space ratio. If a signal received does not satisfy this condition, a repetition cycle is initiated at the relevant station, for example station A. In the practical embodiment this repetition cycle has a duration of four signals. During this repetition cycle the printer in the relevant station A is blocked and transmission at station A takes place from a memory device in which the last three signals transmitted are stored. In the repetition cycle the transmitter in the relevant station A, holding a request for repetition, transmits as its first signal a special signal, also called a service signal mostly referred to as signal "I," followed by three signals from the memory device. On repetition of the signal "I" in the counter of station B, a repetition cycle is initiated at that station. During this repetition cycle the printer at station B also is blocked and transmission takes place from station B from its corresponding memory device. In the repetition cycle the transmitter of station B transmits as its first signal a signal "I," indicating that a repetition follows, followed by three signals from the memory device. After the repetition cycle, the blocking of the receiver at station A is automatically removed. If then the next signal (under normal circumstances the signal which has been received disturbed earlier and for which repetition has been asked) arrives correctly, it is printed. If it arrives mutilated (it does not exhibit the correct mark-space ratio) a fresh repetition cycle is initiated, the printer being blocked again for this period. In the repetition cycle some of the signals transmitted, that is from station B to station A, had earlier been correctly received and printed at the relevant station. These signals must not be printed again on second repetition during the repetition cycle. Therefore the printer is blocked during the repetition cycle. Thus these signals already received correctly are prevented from being printed once more. The blocking of the printer is removed automatically at the end of the repetition cycle, after which there arrives immediately a signal not yet received earlier. If this signal is received correctly it is printed. A perfect working synchronization is a first requirement to insure that things go on in the described good order according to these prior art systems.

If there arises a slight deviation from the synchronism between the two stations, a signal may either get lost or be printed a second time is a repetition cycle. This deviation from synchronism may occur particularly if the communication has been disturbed for a comparatively long time. In such a period one repetition immediately follows the other. If the oscillators in the two stations are not exceedingly constant a deviation from synchronism may arise causing the above mentioned errors. Now such a deviation from synchronism will not so soon occur if crystal controlled oscillators are used but with simple oscillators having less good frequency constants this evil can easily occur.

A class of these systems, particularly intended for less intensive traffic, are equipped with sets provided with less accurate generators for determining the working rhythm. In these systems go and return paths are often over the same channel, which, in order to deal with the less dense traffic must be made available between a calling station and a called station in a very short time by a simple start signal.

Signals provided for the purpose of maintaining synchronism are derived in principle from the traffic between the two counter-stations, on the understanding that during an initial period the receivers of the called station and of the calling station are thus put in time by the transmitters of the calling station and of the called station, respectively, as a result of which a phase angle is established between the distributors of transmitter and receiver, which depends on the propagation time in the go and return path.

The corresponding angle at the called station is in principle equal to zero (or a cycle) in a one-channel system and to $360/m$ in an $m$-channel system. In systems of this kind element synchronism and signal synchronism are to be distinguished. Moreover there is the synchronism of the repetition cycles. Hereinafter the word "signal" means a multi-element signal, such as of seven units or elements, and the words "signal synchronism" comprises a "system cycle" of a predetermined number of signals in a group, such as four signals.

Accordingly it is an object of this invention to insure the maintenance of synchronism and provide for the establishment of the three forms of synchronism almost immediately after a call, and to check them quickly and to restore them, if necessary, after a period in which they may have been lost due to adverse traffic conditions.

Another object is to provide such a system having signal error detection and automatic repetition of the detected erroneous signal.

Another object is to provide such a system which insures that no signals are either lost or added after relatively long interruptions in a message, or during automatic repetition cycles.

Another object is to maintain such system synchronization by the reception of the message signals.

Another object is to maintain element synchronization in each multi-element signal and employ the elements in each signal for determining a system cycle of a predetermined number of signals for system synchronization.

Another object is to automatically establish in such a system, the system cycle synchronization before establishing the repetition cycle synchronization, both at initiation and after interruption of a message.

Another object is to maintain in such a system, synchronization of the repetition cycle with that of the system cycle, even if the system cycle is automatically lost because of fading.

Another object is to provide in such a system that one station starts before any other to initiate the system cycle synchronization.

Generally speaking, the automatic error correcting telecommunication system of this invention comprises a network of at least two stations, each of which stations has a transmitter and receiver, and in which each transmitter and receiver at each station has an input circuit, a memory device connected to said input circuit, a distributor for controlling said memory device, a repetition device connected to said distributor, and an output circuit connected to said memory device and said distributor. The receiver at each station also includes an error detector device connected to its corresponding memory device which detector controls the repetition device in that receiver, and the two repetition devices in the transmitter and receiver at each station are connected together.

The input device in the transmitter of each station may comprise a telegraphic code tape reader controlled by a tape feeding impulse device. Each transmitter also includes a circuit for producing special signals "I" and idle time signals.

The memory circuits in the transmitter and receiver at each station may comprise a storage device, such as a shift register, for storing a pre-determined number of signals, such as three signals, depending however upon the propagation time for the signals being transmitted between the two stations. Connected to each of these memory devices and their corresponding distributors there also may be included a code converter for converting in the transmitter the standard five unit Baudot telegraph code from a tape into the seven-unit constant ratio code of the system, and in the receiver from the seven-unit constant ratio code back to the five-unit standard telegraph code of the printer, which may comprise part of the output circuit of each receiver.

The distributor at each station is controlled by means of a pulse generator which pulse generator at each station is controlled by a correcting circuit which may comprise a counter, a memory circuit and correcting pulse generating circuits interconnected in this order and controlled by the input circuit at its corresponding receiver.

In addition to the above standard circuits except for the correcting circuit just mentioned, the improvements of the system of this invention include in the transmitter at each station means for generating special signals for controlling the system cycle repetition for the synchronization of the two stations according to this invention by detecting the time of reception of the leading edge or start of each signal and automatically correcting the synchronization in accordance with any change in the speed and/or drift of signals from the transmitter of the remote station. This special signal generator may be connected to a scanner circuit which may be a part of the output circuit and is connected to the distributor and memory circuit of that receiver. There is also provided a means for producing system cycle repetition by acting upon the particular number of signals in a system cycle, which number may be equal to the number of signals in the repetition cycle for error correction purposes, but is not necessarily in phase with the repetition cycle. This special system cycle grouping of the signals may comprise the inversion of the mark-space ratio in particular signals of each system cycle group, which inversion is regularly repeated in the signals each cycle. For example, if four signals are employed in the repetition cycle, four signals are employed in the system cycle, but in the system cycle, the first two signals may be transmitted in the normal mark-space ratio while the second two signals are transmitted in the inverted mark-space ratio, that is in which the marks of the normal signal are transferred into spaces and the spaces in the normal signal are transferred into marks. These normal and inverted signals thus mark the system cycle group of signals.

In addition to these two circuits in the transmitter of each station there is also provided a master slave control circuit which controls the system depending upon which station in the network is the first to start the transmission; the first station to start becoming the master station, and the station being called or second to start becoming the slave station. In the event both stations are started simultaneously there is an additional circuit provided in the receiver of each station for indicating such a simultaneous starting so that a re-start may be made of one of the stations so that this simultaneous starting can be avoided. Such a simultaneous start of two stations in the same network, however, is very improbable in that to start them exactly the same time, they must be done within milliseconds of each other, which practically rarely occurs. Thus the stopping and re-starting of one of the stations manually after the indication of such a simultaneous start at both stations, would hardly occur twice in succession. However, if it does another manual stop and re-start would have to be performed.

In the receiver of each station there is also provided in combination with the error detector circuit, detector circuits for the special signal "I" and the idle time signals, which detector circuits in turn control an additional or lock position circuit for insuring that the position of the system cycle is maintained between the stations during and after a stopping of that receiver due to a prolonged fading or mutilation of received signals. A time delay device, such as for ten seconds, may be connected to this lock position circuit for controlling the stopping of this receiver after such a prolonged fading period. This lock position circuit prevents re-starting of the receiver after the fading or multilation is over, until the system is in exact system cycle synchronism with that of the signals received before the stop occurred. Furthermore each receiver circuit includes a system cycle counter and two special signal testers, one for the first special signal "I" received upon a start or re-start, and the other for the second special signal "I" received immediately thereafter, for controlling the initiation of the circuit to be sure that the system cycle of this receiver is in proper synchronization with that system cycle of the transmitter of the station from which it is receiving these signals.

Thus upon the starting of one calling station in the system by transmission of the first signal, the receiver at the called station is not locked into system cycle synchronization with its associated transmitter until at least two special signals are sequentially received from the calling station; and then the called station transmits special signals followed by three idle time or other signals to indicate to the calling station that the calling station is in system cycle synchronization. After this the messages to be transmitted between the stations may proceed. The difference in phase between the system cycle of the transmitter at the calling station and the receiver at the calling station is due to the difference in transmission time between the two stations plus the two signal time delay required at the slave or called station, before the slave station transmitter is locked into system cycle synchronization.

In the event a distortion or mutilation occurs after the stations are in operation and in system cycle synchronization, special service signals "I" also are transmitted for a request for repetition starting a repetition cycle, which repetition cycle may or may not be in phase with the system cycle, but what ever phase between these two cycles occurs this phase is maintained until the correction has been made and the repetition cycle is completed. Thus when a slave station detects a mutilation, it locks the distributors of its transmitter and receiver in the phase they are at that moment and they are not unlocked until the error correction or repetition cycle is over. Accordingly, during this repetition period the master station acts as a slave to the slave station, and thus either station may be master or slave depending upon which is the first to initiate the communication between the two stations and also which in the event of a prolonged mutilation is stopped. During the repetition period the transmitter continues to transmit special signals "I" until the special signal "I" is received back from the other station, after which the further appropriate signals are transmitted from the memory followed by signals which have not yet been transmitted earlier which belong to the current message.

The above mentioned and other features and objects of this invention and the manner of attaining them will become more apparent and the invention itself will be best understood by reference to the following description of an embodiment of the invention taken in conjunction with the accompanying drawings, wherein:

FIGS. 1*a* and 1*b* are tables of (1*a*) how a four signal system cycle may be established, and (1*b*) how one such cycle may be transmitted and received, respectively, for automatically insuring synchronization of a receiver at one station with a transmitter at another station;

FIG. 1*c* is a table of the seven-elements employed in the special signal "I" and idle time signals "$\alpha$" and "$\beta$" used in the synchronization system according to this invention;

FIG. 1*d* is a schematic time diagram for establishing the initial system synchronization cycle between a master and slave station in a telecommunication network according to this invention;

FIG. 1*e* is a schematic time diagram similar to FIG. 1*d* showing a repetition cycle for correction of a mutilation received at a slave station;

FIG. 1*f* is a schematic time diagram similar to FIG. 1*e*, but with the mutilation received at the master station instead of the slave station as in FIG. 1*e*;

Figure 3:
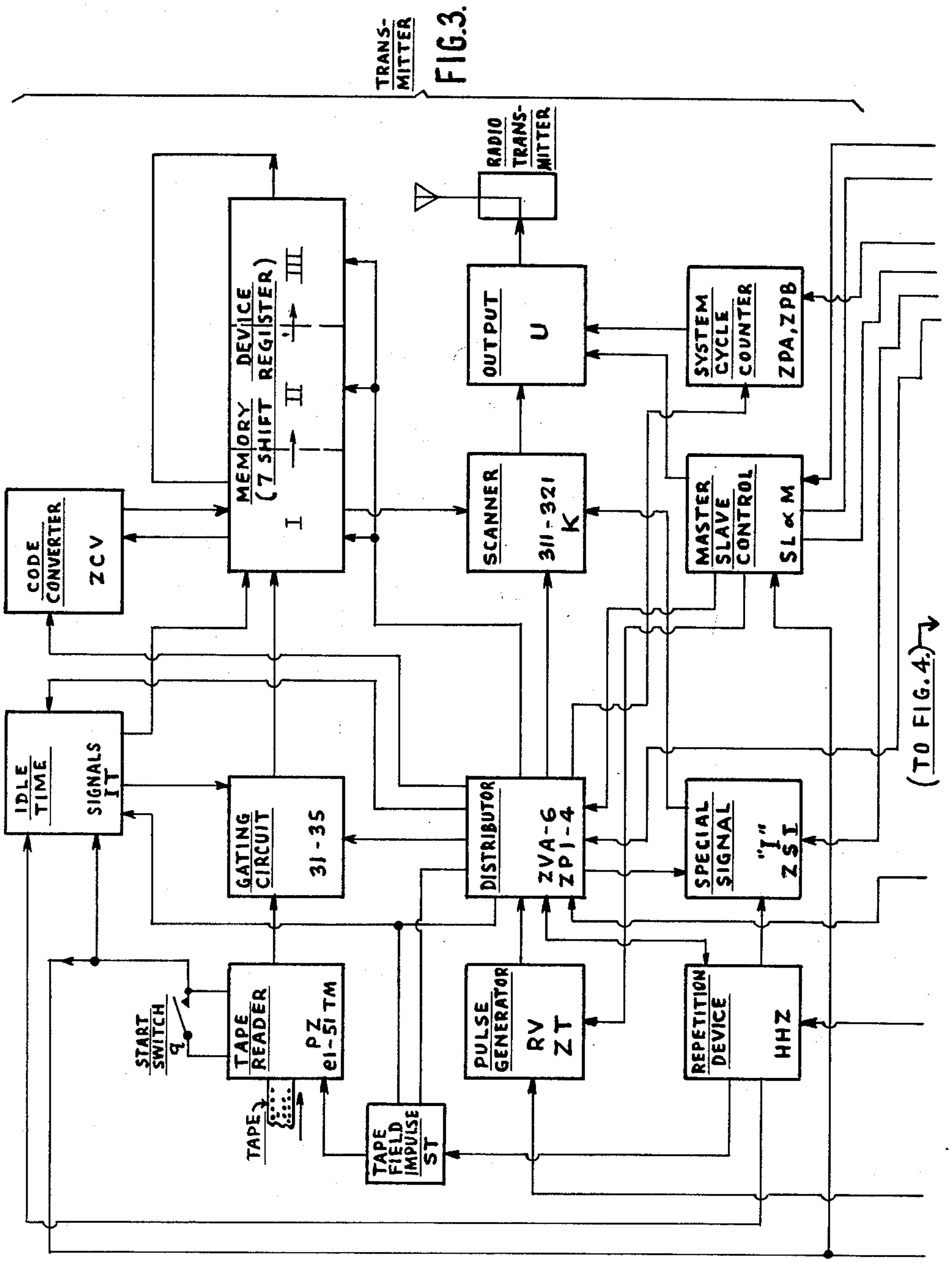
FIGS. 3 and 4 are schematic block diagrams of a transmitter and receiver, respectively, at one station, with the blocks connected together according to the embodiment of this invention.
Figure 4:
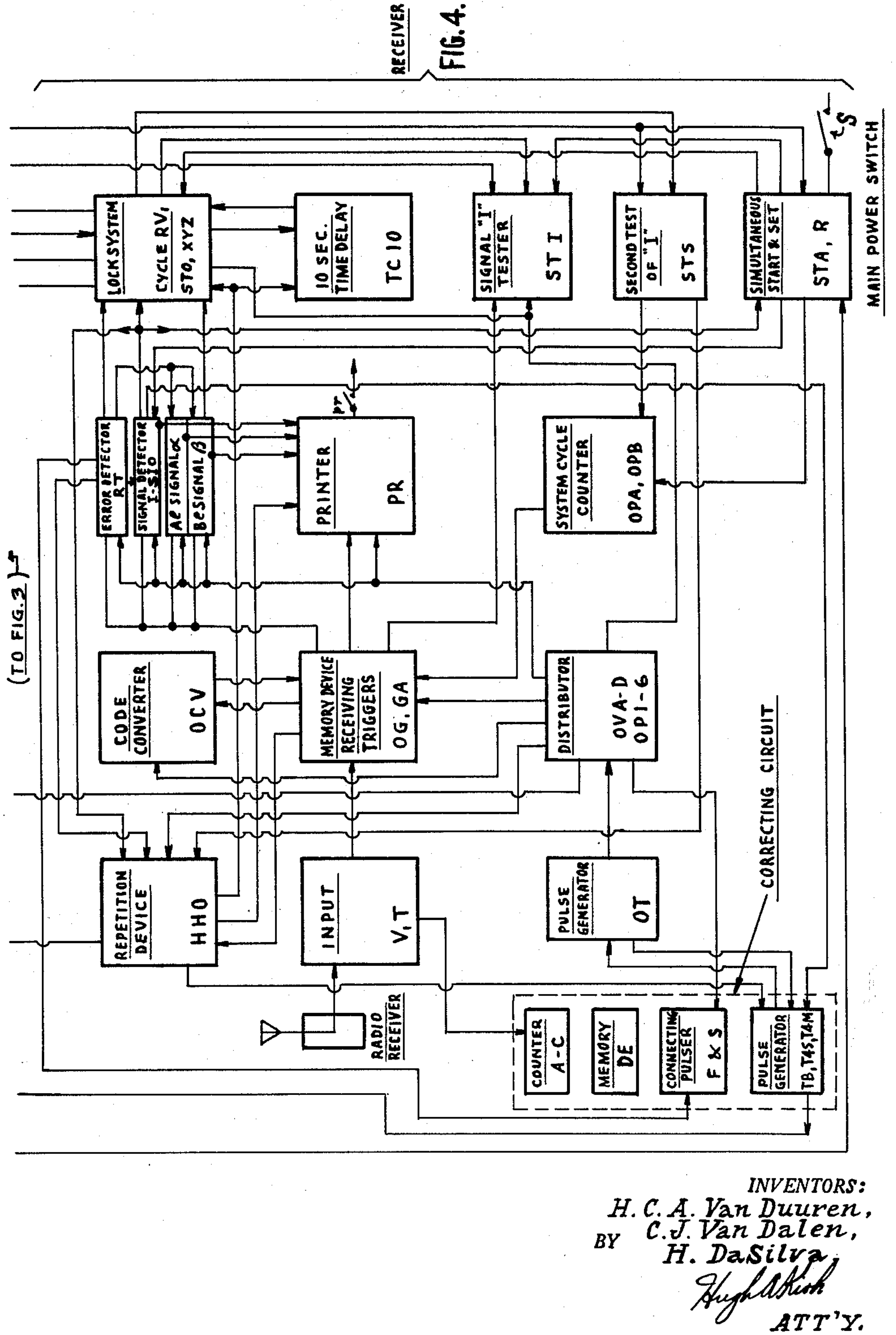
Figure 5:
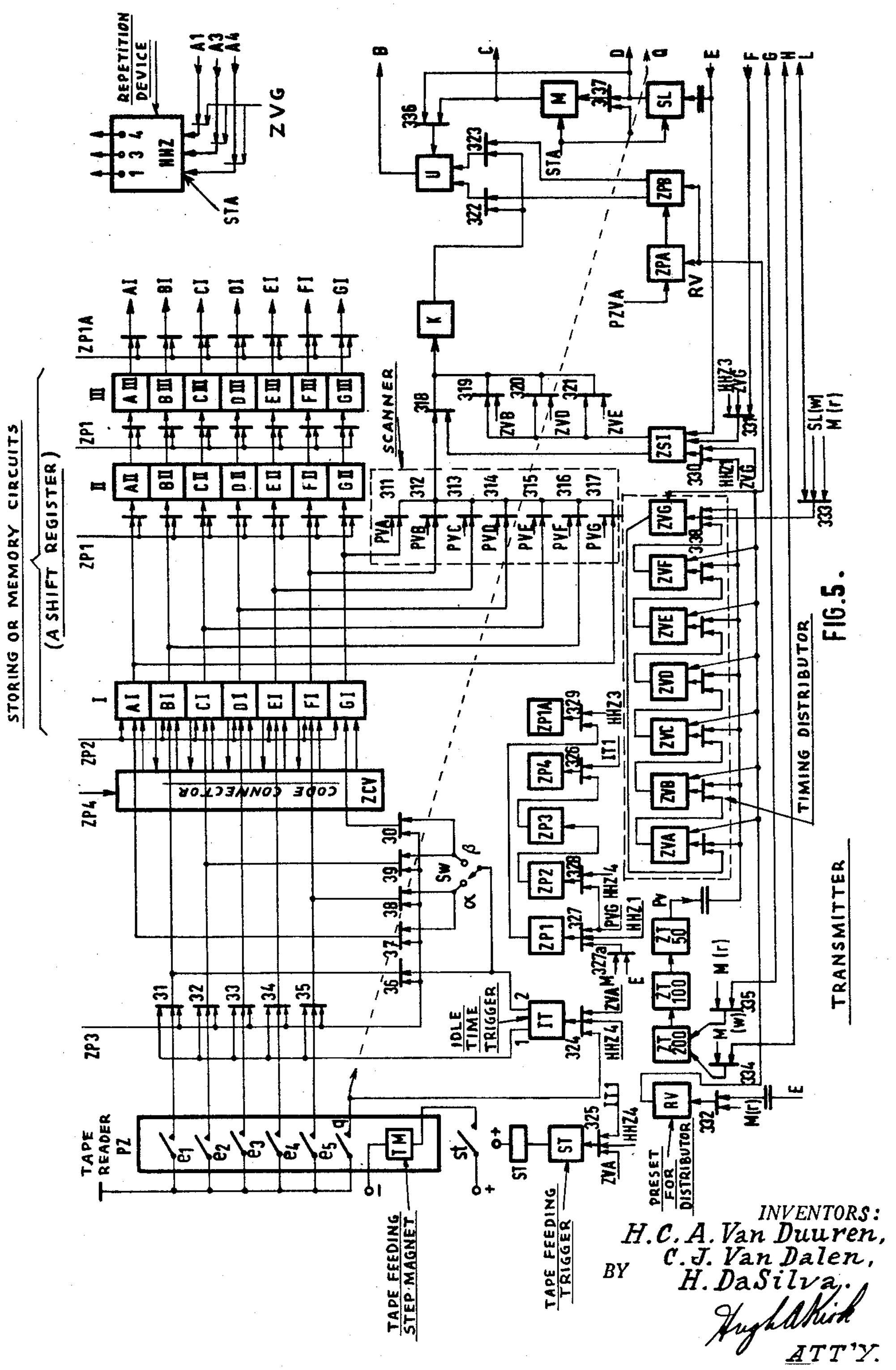
FIG. 5 is a disconnected schematic block diagram of the circuits comprising the transmitter according to FIG. 3.
Figure 6A:
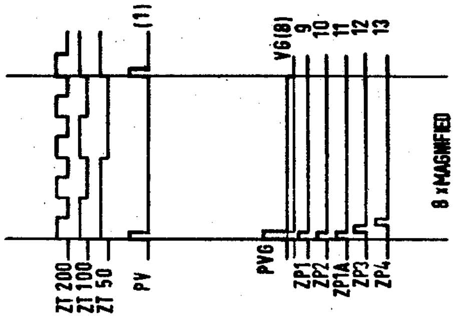
Figure 6:
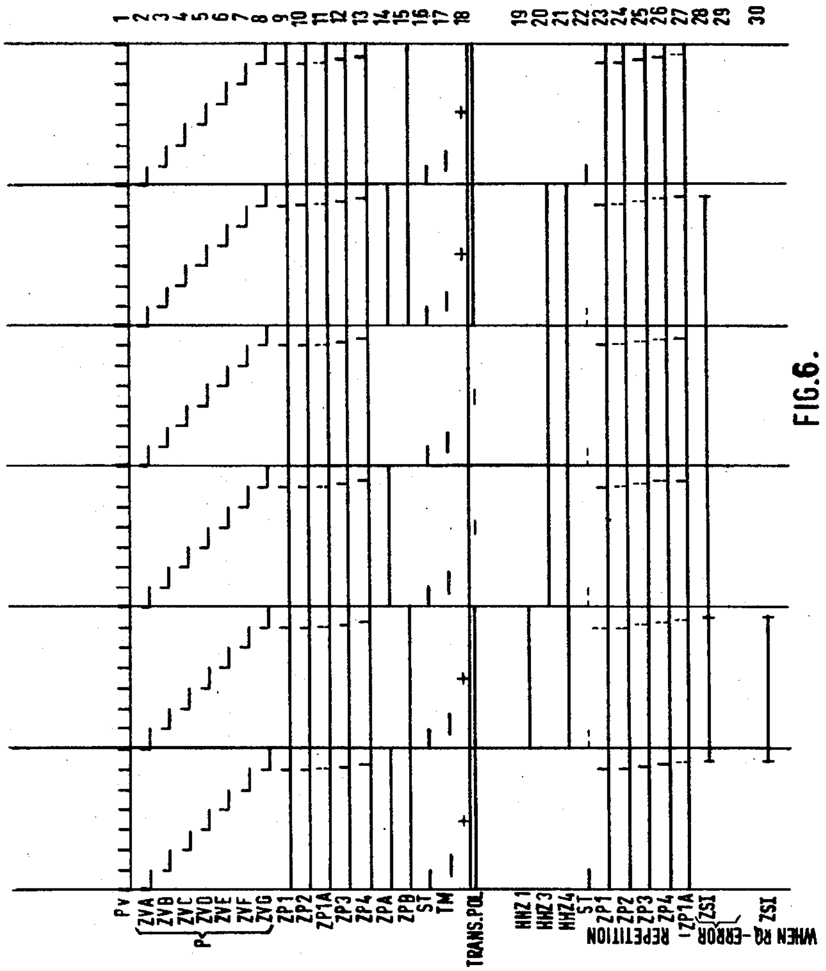
Figure 7:
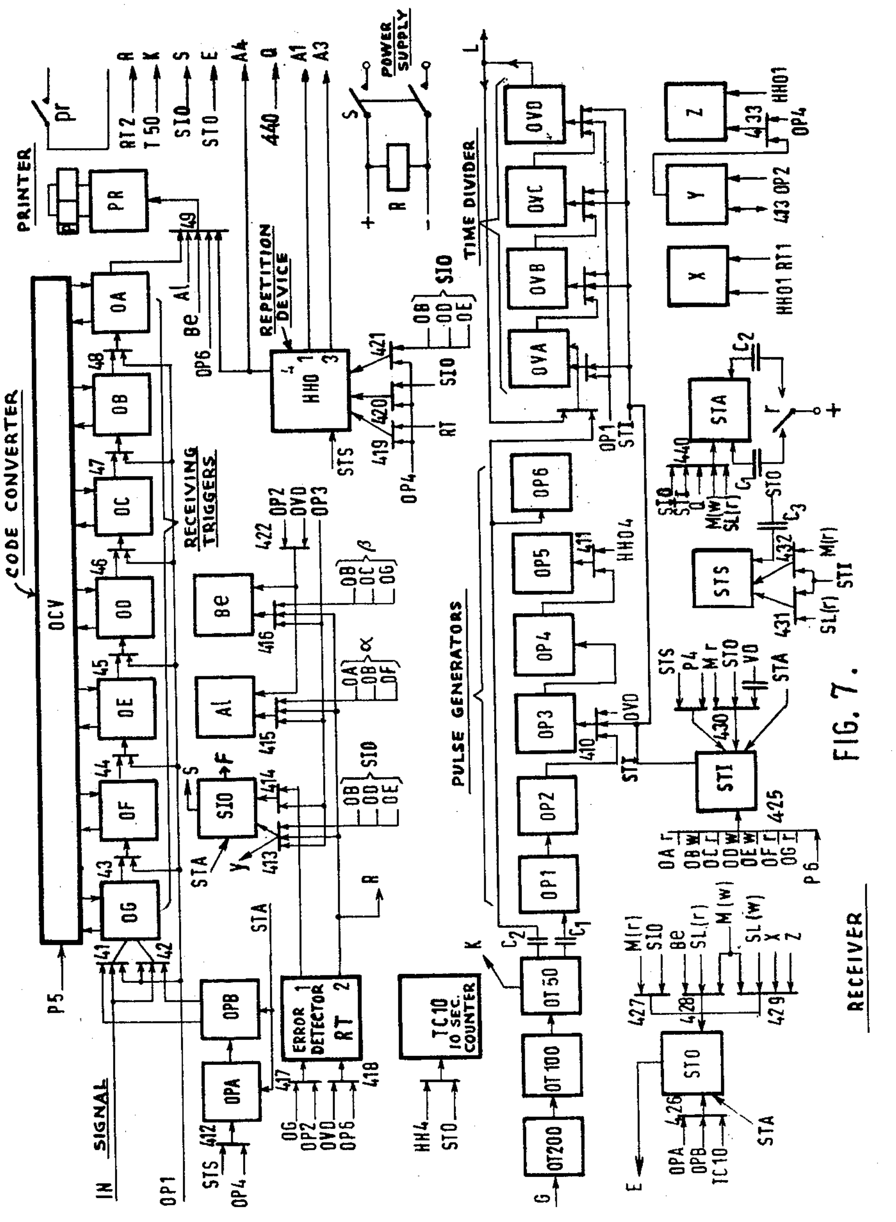
Figure 8A:
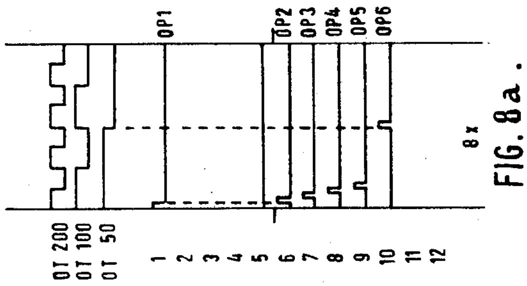
Figure 8:
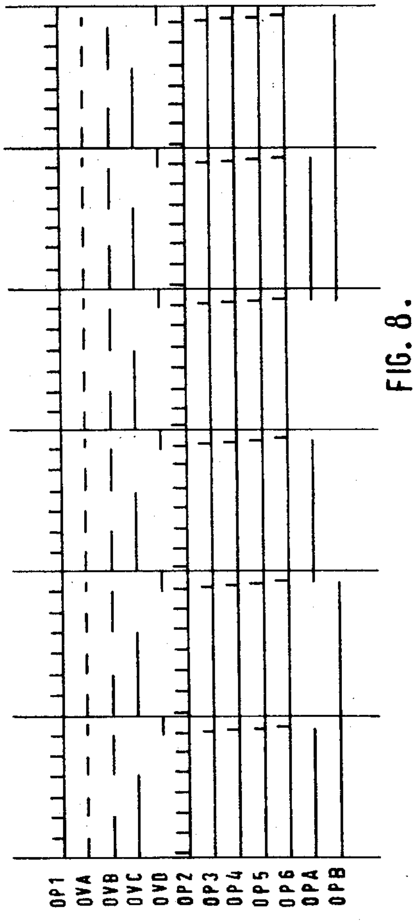
Figure 9:
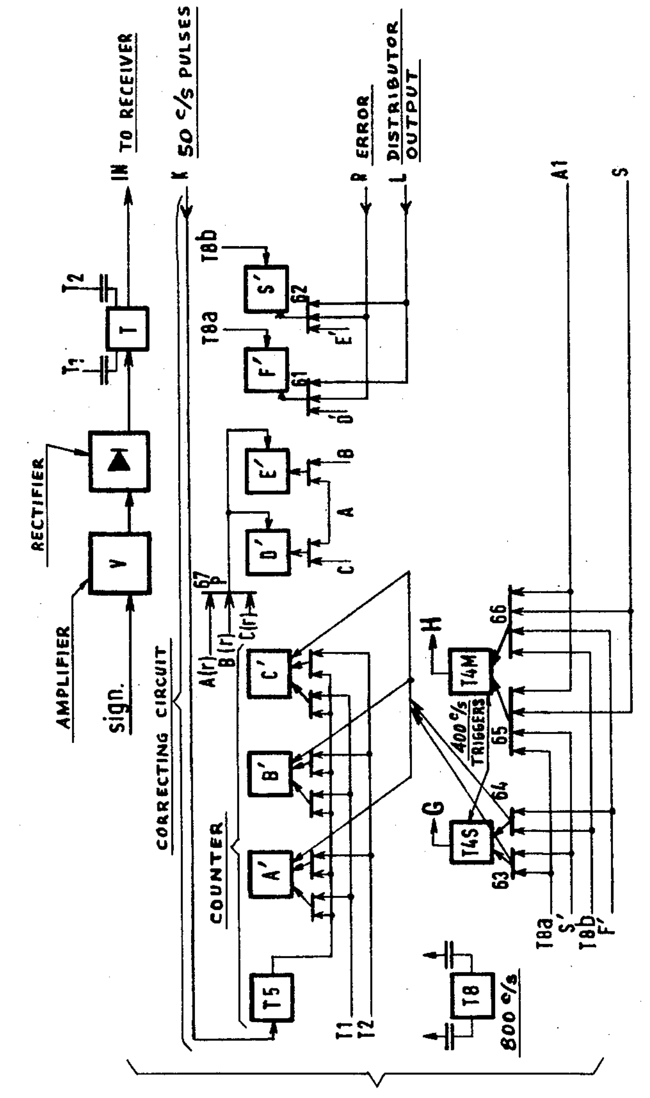
Figure 10:
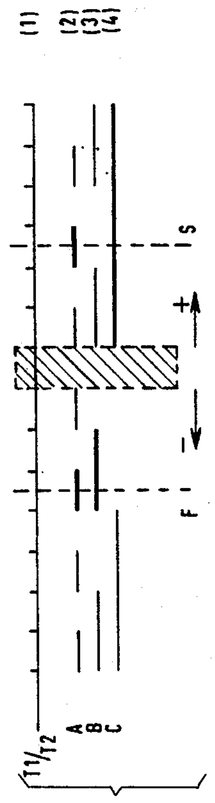

FIGS. 6 and 6*a* are time diagrams of the operation of the circuits in FIGS. 3 and 5;

FIG. 7 is a disconnected schematic block diagram of the circuits comprising the receiver of FIG. 4 for the transmitter of FIGS. 3 and 5;

FIGS. 8 and 8*a* are time diagrams of the operation of the receiver circuits of FIGS. 5 and 7;

FIG. 9 is a disconnected schematic block diagram of the correcting circuit part of FIG. 4; and FIG. 10 is a time diagram of the operation of the correcting circuit of FIG. 9.

The following detailed description of an embodiment of this invention will be made according to the following outline.

I. Signals:
  (1) Initiating System Cycle (FIGS. 1*a*, 1*b*, 1*c*, 1*d*)
  (2) Repetition Cycle (FIGS. 1*e*, 1*f*)
  (3) Fading During Repetition Cycle (FIG. 2)
II. Starting Circuits (FIGS. 3, 4, 5 and 7):
  (1) Simultaneous Starts (FIGS. 4 and 7)
III. The Transmitter (FIGS. 3, 5 and 6):
  (1) Pulse Generator and Distributor (Time Pulses and Starting)
  (2) Tape Reading and Code Converting
  (3) Scanner and Inverter (System Cycle Counter)
  (4) Idle Time Signal Generator
  (5) Repetition Device
IV. Receiver (FIGS. 4, 7 and 8):
  (1) Pulse Generator and Distributor
  (2) Inverter and Receiving Circuits
  (3) Converter and Printing Circuits
  (4) Error Detection
  (5) Repetition Device
V. Master-Slave Station Relationship (FIGS. 3, 4, 5, 6, 7 and 8):
  (1) Systems Cycle Synchronization
  (2) Resynchronization — (*a*) During Repetition Cycle
VI. Phase Correcting Circuit (FIGS. 9 and 10):
  (1) Slave Station Locked Distributors
  (2) Correction Circuits

I. SIGNALS

According to the invention a number of measures have been taken for insuring the maintenance of synchronism between two stations.

(1) A first measure is the introduction of a so-called "system cycle" besides the repetition cycle already known. For the transmitter of the calling station (master station) this system cycle begins with the transmission of the first signal to be transmitted by this station and its duration is equal to the duration of the repetition cycle; in the specific example described herein this is the duration of four signals.

(2) Another measure according to the invention consists in that in the system cycle the signals are given a specified characteristic order of succession.

Figure 1A:
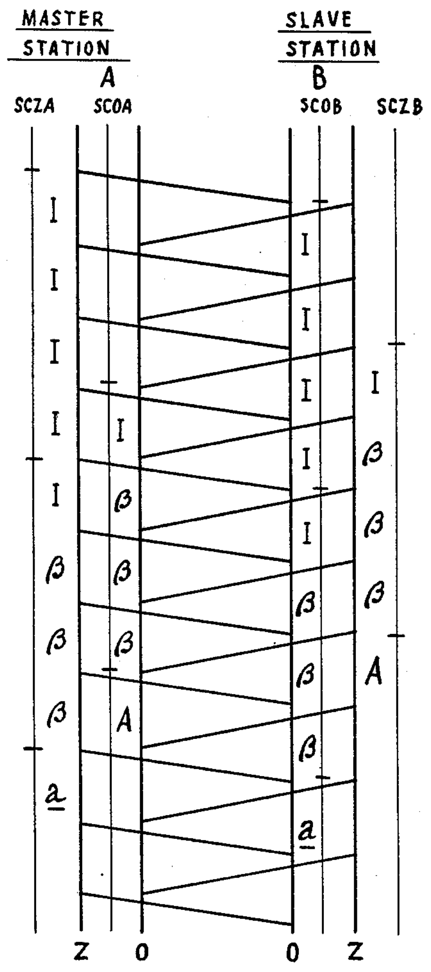

In the given example the first and the second signal are transmitted normally (i.e. in the example with three marking and four spacing elements) and the third and the fourth signal inverted (i.e. with four marking and three spacing elements) (see FIG. 1*a*, first column). The normal and inverted signals in the system cycle might as well be transmitted in another sequence, as is indicated in second, third and fourth columns of FIG. 1*a*. Further the signals could also be numbered.

Now the system cycle must be taken over by the receiver of the called station B (slave station). According to the invention the receiver at the called station is so arranged for this purpose that on reception of a specified signal, transmitted normally (so having three marking and four spacing elements) the receiving distributor is provisionally started. If then the second signal, transmitted normally, is also received with the correct mark/space ratio, the receiving distributor is considered as definitely started and the transmitting distributor is started as well now. Herewith the system cycle has been passed to the receiver at called station B, in which it has begun with the reception of the first signal. If at the called station B the first or the second signal received does not exhibit the correct predetermined mark/space ratio, the receiver returns to the initial state, the distributors stop and the process of establishing the system cycle starts anew. For the transmitter at station B, the system cycle has begun with the transmission of the first signal and this indication is passed to the receiver at station A in the manner described above.

Due to certain circumstances the signals transmitted in the sequence: normal (1), normal (2), inverted (3), inverted (4) may arrive at the receiving end in four different ways (see FIG. 1*b*). Only if the receiver finds the transmitting sequence indicated in the first column, as is shown in the second column of FIG. 1*b*, is the system cycle taken over and the connection can be completed. Any other sequence of arrival at the receiver prevents the completion of the connection.

According to the third column of FIG. 1*b* the first signal received is an inverted signal (four marking and three spacing elements). Since the receiver only accepts as correct a signal having three marking elements and four spacing elements, the relevant signal is rejected; the distributors do not start.

According to the fourth column the first signal is not accepted either; the distributors do not start.

According to the fifth column the first signal received is a normal signal. The receiver accepts this signal as correct, the receiving distributor is provisionally started. The second signal is received inverted, however. The receiver does not accept this signal as correct, so the receiving distributor stops and the transmitting distributor is not started.

If the connection has been set up in the beginning according to the first and second columns of FIG. 1*b*, it can be completed in the way described above. Now this has its consequences for the maintenance of synchronism between calling station and called station, also during the connection. If after an interruption of the connection due to a disturbance of a comparatively long duration the connection is re-established, the receiving distributor of the called station B will only be considered as definitively started, if the signals are received in the sequence according to second column of FIG. 1*b*. In this way it is not possible that on re-establishment of the connection a deviation from synchronism turns out to have arisen, and thus it is impossible that on re-establishment of the connection either a signal too many or a signal too few is printed.

The system cycles follow each other regularly and a repetition cycle only occurs on reception of a mutilated signal or on reception of a special signal "I." Consequently, the position of the repetition cycle with respect to the system cycle in the time diagram, in other terms the phase relation between repetition cycle and system cycle is quite arbitrary, but in any repetition period it is determined and in the system according to the invention the phase relationship existing in a certain case always re-appears after the said repetition period, i.e. after the re-establishment of the connection, so that no signals too many or too few are printed. The beginning of the repetition cycle may coincide either with the first (1), the second (2), the third (3) or the fourth (4) signal in the system cycle.

Let it be supposed that the beginning of the repetition cycle caused by a signal received mutilated coincides with the first signal of the system cycle of the receiver. If now the connection is interrupted for a longer period as a result of disturbances, the receiver distributor will be stopped and return to the initial state. The receiving distributor waits then until it is started again in the way described above by a signal from the other station and takes over the system cycle of the other station by comparing the pattern: two signals normal, two signals inverted. If the system cycle is once taken over, the position of the repetition cycle is automatically correct and no signals can get lost or are printed twice.

The invention will now be explained and elaborated according to a specific embodiment of a 7-unit or element telegraph signal in which three mark elements and four space elements are employed and in which the idle time element is indicated by the arrangement of the marks and spaces in the first row of FIG. 1*c* and the other two rows indicate idle time signals $\alpha$ and $\beta$, respectively; the reason for which arrangement will be described later in the detailed description of FIGS. 5 and 7 of the drawings.

I–1. INITIATING SYSTEM CYCLE

In this chosen embodiment, according to the invention the calling station or master station, further referred to as station A, initiates a connection by transmitting a series of signals "I" in the way described above. (In the existing system a signal "I" is transmitted followed by three signals from the memory.) This first activity is referred to as "initial synchronization." At the station A transmitter the system cycle begins with the transmission of the first signal "I"; the first and the second signal are transmitted normally; and the third and the fourth signal are transmitted inverted (see FIG. 1*d*). Along the first and the second thick-drawn vertical lines are indicated, respectively, the signals transmitted and received by station A. Along the third and fourth thick-drawn vertical lines are indicated, respectively, the signals received and transmitted by station B. Along these thick-drawn lines thin lines are shown, divided according to the successive system cycles: SCZA, SCOA, SCOB and SCZB respectively, referring to the system cycle of the transmitter at A, the system cycle of the receiver at A, the system cycle of the receiver at B and the system cycle of the transmitter at B. In order not to make the explanation unnecessarily complicated, it has been assumed that no disturbances occur during the establishment of the connection. On correct reception of the first signal at station B, the receiving distributor of this station is provisionally started. This first signal is not printed since service signals as signal "I" and "$\beta$" are never printed. On correct reception of the second signal at station B, the receiving distributor of this station is considered as definitively started. The receiver at station B knows now that the two signals received are the first in the system cycle of the transmitter at station A and takes over this system cycle, so in the receiver at station B the system cycle begins with the reception of the first signal from station A. On correct reception of the second signal at station B the transmitting distributor of this station is started too. Thus in this example the system cycle of the transmitter at station B always begins two signals later than the system cycle of the receiver at that station B. Now station B can transmit too. For the transmitter at station B the system cycle has begun with the transmission of the first signal.

Now the system cycle of the transmitter at station B must be taken over by the receiver at station A. This is done in a similar way as in which the transmitter at station A initiated the system cycle for the transmitter at station B; only the signals by means of which it is done differ. The system cycle of the receiver at station A begins a fixed time later than the system cycle of the transmitter at station A, determined by the propagation time both ways. In the first system cycle, the transmitter at station B answers by transmitting a signal "I" and three idle time signals "$\beta$." On receipt of this first signal at station A, the receiving distributor of this station is provisionally started, and on receipt of the second signal the receiving distributor at station A is considered as definitely started. Thus the system cycle is taken over by the receiver at station A and is considered as having begun with the reception of the first signal. On receipt of the first signal at station A, it is known at station A that the receiver at station B has taken over the system cycle from the transmitter at station A and in a fresh transmitter system cycle, station A will transmit a signal "I" followed by three signals "$\beta$." Now the transmission of messages can be started at either end of the connection. At station A this start is indicated by the transmission of a small letter "a," at station B by the transmission of a capital letter "A" (see FIG. 1*d*).

I–2. REPETITION CYCLE

Figure 1E:
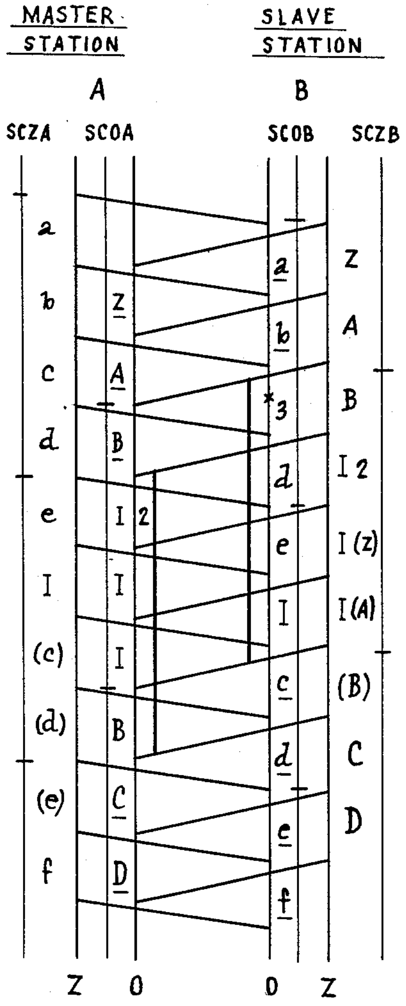

FIG. 1*e* shows what happens, if during the transmission of messages a signal is received multilated at station B. In FIG. 1*e* the third signal (3) is received multilated, which is indicated by a crosslet or "X." Now a repetition cycle begins at station B and the printer is blocked for the duration of four signals (which is indicated in the figure by the extra thick drawn line beside the line marked "O," and station B asks for repetition.

In the existing transmission system, station B asks for repetition by transmitting as the first signal in the repetition cycle the special signal "I," after which it transmits from the memory the last three signals transmitted (in this case "Z," "A," and "B"). In the system according to the invention, however, after the transmission of the first signal "I," the station asking for repetition continues transmitting signals "I" until it has received back a signal "I" from the other station A. So in this case station B transmits in all three signals an "I." In the meantime station B has received a signal "I" from station A and goes on by transmitting the letter "B" from the memory device. The signals placed in parentheses behind the signals "I" are the signals lying in front in the memory device and which wuld have been transmitted, if a signal "I" had been received from the station A.

On receipts of the first signal "I" at station A, a repetition cycle begins at this station. In the figure this cycle is marked by an extra thick line beside its line O. During this repetition cycle the printer at station A is blocked and station A starts repeating. Station A transmits as its first signal a signal "I," to indicate that what follows is a repetition; after that the last three signals transmitted are re-transmitted from the memory, namely letters: ("c," "d," "e"). The first signal "c" is the signal the repetition of which was asked for. This signal "c" arrives undisturbed at station B and the printer at station B is immediately unblocked, so that this signal is printed, after which traffic goes on normally.

Figure 1F:
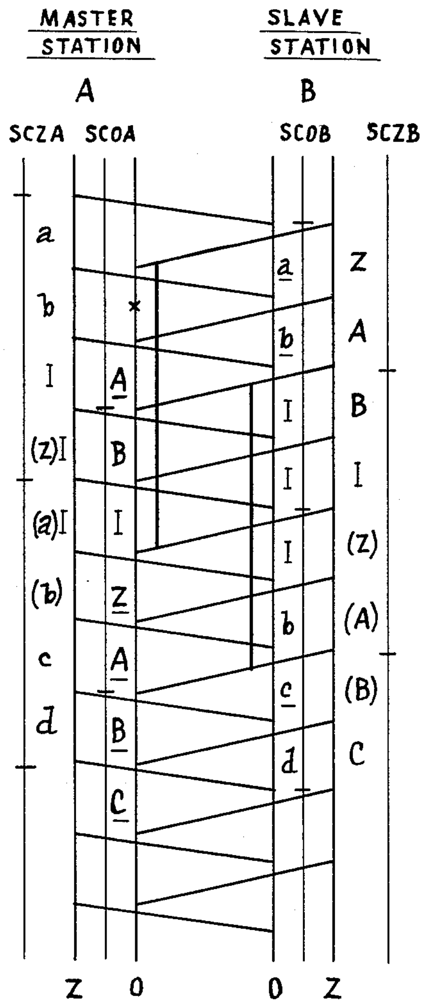

FIG. 1*f* shows what happens, if during the transmission of messages a signal is received multilated at station A. In FIG. 1*f* the first signal "Z" is received mutilated at station A, which is indicated by a crosslet or "X." Now there begins at station A a repetition cycle, marked by an extra thick line beside its line O, and the printer is blocked for the duration of this cycle, and station A asks for repetition by transmitting signals "I" until a signal "I" is received back from the other end or station B. In the meantime station A receives a signal "I" and continues by transmitting the letter "b" from the memory, etc.

On receipt of the first signal "I" at station B there begins at this station a repetition cycle marked by an extra thick line beside line O. During this repetition cycle the printer at station B is blocked and station B starts repeating. As the first signal station B transmits a signal "I" to indicate that a repetition follows and then proceeds to transmit from the memory the letters "Z," "A," "B," etc. The course of things is the same as has been described for the case of FIG. 1*e*. After the repetition cycle traffic goes on normally.

The receiving and transmitting distributors in the called or slave station are firmly coupled, so any phase correction of a signal at this station (the corrected station) results in a synchronization of both the transmitting and the receiving distributor. Signal correction at the calling station (the correcting station) only occurs at the receiver. No signal phase correction takes place for a signal which has been detected to be disturbed. According to the invention, at the calling station, correction of receiver and transmitter only occurs on receipt of a signal "I," that is, during a repetition cycle period.

I–3. FADING DURING REPETITION CYCLE

Figure 2:
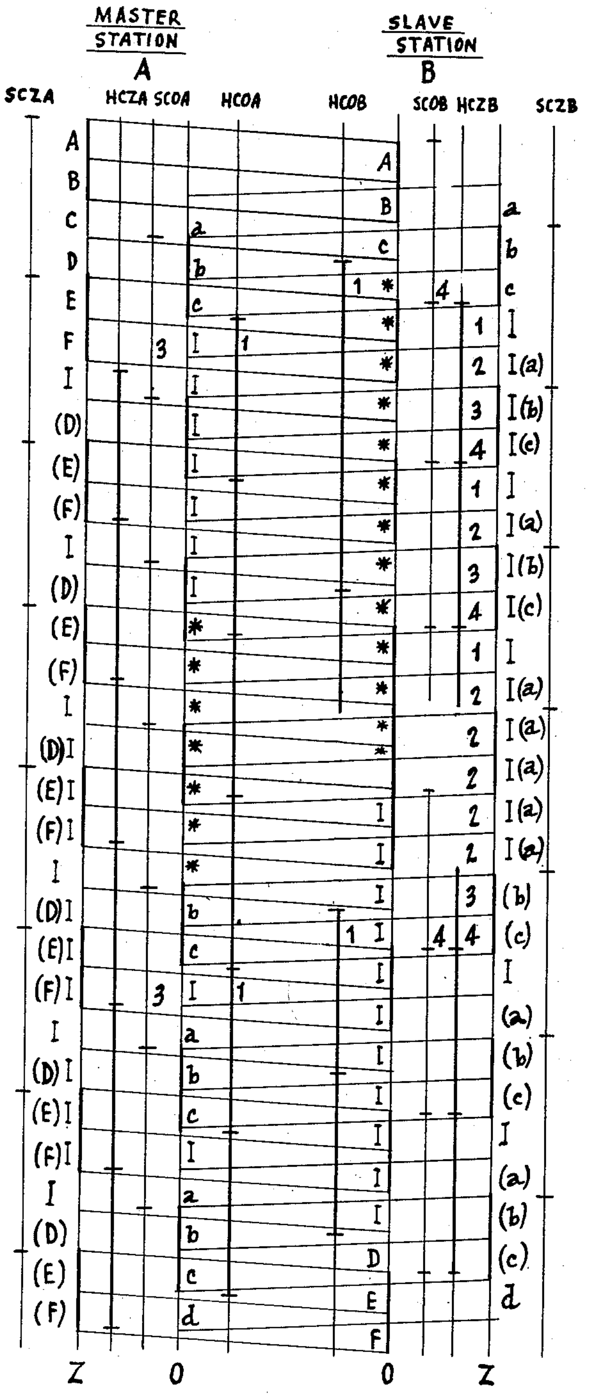
FIG. 2 is a schematic time diagram similar to FIGS. 1*d*, 1*e* and 1*f* showing how an automatic system synchronization takes place according to this invention after a long period of fading.

FIG. 2 shows the progress of transmission and reception, if during the transmission of messages, the connection is disturbed for a longer time such as by long fading, so that several repetition cycles follow each other immediately. In such a case a re-synchronization will be effected. After the reception of the third signal (the letter "c") at station B a series of signals is received mutilated. On receipt of the first mutilated signal "*" at station B, there begins at this station a repetition cycle. The reception of this first mutilated signal (the first in the repetition cycle of the receiver at station B) coincides with the fourth signal (4) in the current system cycle of the receiver at station B, so the phase relationship in this case is such that "1" in the repetition cycle coincides with "4" in the system cycle. However large the deviation from synchronism may become, on reestablishment of the connection, "1" will always correspond to "4" and thus no signal can get lost or be printed too often. If fading occurs during a repetition cycle the phasing between the repetition cycle and the system cycle (automatically) remains the same after initiation again of the system cycle. Once a repetition cycle is started the phase between it and the system cycle remains the same until the repetition period is completed, even if fading occurs during said repetition period.

Beside the vertical lines in FIG. 2 designated by Z (transmitter) and O (receiver) there are lines indicating the system cycles, viz. at station A for the transmitter SCZA and for the receiver SCOA, and at station B for the transmitter SCZB and for the receiver SCOB. Further there are lines indicating the repetition cycles, viz. at station A for the transmitter HCZA and for the receiver HCOA and at station B for the transmitter HCZB and for the receiver HCOB.

Station B asks for repetition by transmitting signals "I" and the disturbance is shown to be of a comparative long duration. When the interval fixed for this purpose is exceeded, the receiving distributor at station B is stopped, which in FIG. 2 is upon receipt of the eleventh multilated signal (see gap in line SCOB). At that moment the receiving distributor passes to the initial state and waits for being started again by the arrival of a series of signals "I" transmitted by the station A, as has been described for the case of initial synchronization in Section I–2 above. Together with the stopping of the receiving distributor at station B (which means the stopping of the system cycle) the repetition cycle has stopped too (see gap in line HCZB); at that moment the letter "a" was in front in the memory and there it remains. After the stopping of the receiving distributor at station B the transmitting distributor (line SCZB) continues to operate, but since it is no longer coupled to the receiving distributor, a deviation from synchronism may arise now.

After the reception of thirteen disturbed signals, station B receives an undisturbed signal "I" again, as a result of which the receiving distributor (see line SCOB) is provisionally started again. After the undisturbed reception of the second signal "I" the receiving distributor at station B is considered as definitively started on receipt of the first signal, so that the receiver system cycle has started again. On receipt of the second signal "I" at station B the receiving distributor is coupled to the transmitting distributor again and thus it is synchronized. Then on receipt of the second signal "I" the transmission at station B of signals "I" is stopped and the repetition cycle of the transmitter is taken up where it had been interrupted, i.e. by the transmission of letters "b" and "c" from the memory.

In the next system cycle, station B receives still signals "I" and considers this as a request for repetition. Then station B transmits a signal "I" to indicate that a repetition follows, and after this signal "I," the last three signals from the memory. In the system cycle following then other signals "I" arrive and station B repeats once more. Then the letter "D" arrives at station B. The repetition cycle in the receiver is meanwhile terminated and the letter "D" is printed and traffic goes on normally. After the disturbance period (repetition period) the connection is re-established at station B on receipt of the second signal "I"; and the receiver system cycle is then considered as definitely started from the reception of the first signal "I." At the fourth signal in this system cycle of the receiver at station B the repetition cycle of the receiver at station B starts again and thus step 1 in cycle HCOB corresponds again to step 4 in cycle SCOB and, consequently, no signals too few or too many can be printed.

On receipt of the first signal "I," a repetition cycle starts at station A. Here the first signal in cycle HCOA coincides with the third signal in cycle SCOA. The transmitter at station A answers by transmitting from the memory the last three signals transmitted earlier, preceded by a signal "I" (to indicate that a repetition follows). The signals continue to arrive disturbed at station B, however. On receipt of the fifth mutilated signal a fresh repetition cycle starts at station B. Station B continues to ask for repetition by transmitting signals "I." Repetition remains disturbed. On reception of the ninth mutilated signal the third repetition cycle starts at station B. This causes station B to stop the receiving distributor. The repetition cycle is interrupted in consequence. The transmitting distributor continues to operate and signals "I"

are transmitted uninterruptedly. In the memory, letter "a" remains in front.

Meanwhile among the signals received at station A, some signals have been found which have not the correct mark-space ratio. One cause may be that the connection is disturbed. Another cause may be a deviation from the synchronism with the transmitter at station B, because in that station the transmitting distributor operates detached from the receiving distributor, which has stopped. In such a case the receiver at station A continually finds errors. After the reception of the disturbed signal, station A asks for repetition in a next repetition cycle of the transmitter. For this purpose it transmits signals "I." According to the invention this is done until in a repetition cycle, four signals among which a signal "I," have been received correctly. In FIG. 2 this is the case after the reception of the signal "I," "a," "b" and "c." After that a signal "I" is received. This means for station A a request for repetition. Station A transmits the last three signals stored in the memory, preceded by a signal "I." After that traffic can go on normally.

II. STARTING CIRCUITS

When the voltage supply is switched in, power delayed operating relay R (see FIG. 7) is energized. At the moment of its switching-in by contacts S, its relay R contract *r* in its normal position shown applies a pulse to the pre-set trigger STA via capacitor C1, which operates in consequence thereof. If the operating time of the relay R is assumed to be in the order of 15 milliseconds the trigger preset trigger STA will be restored to normal after 15 milliseconds by means of a pulse applied to it via capacitor C2 by the switching over of contact *r*.

In the operating period of the trigger re-set trigger STA, the following things happen (in the transmitter (FIGS. 3 and 5)):

(Z*a*) Memory groups I, II and III are controlled according to the idle time signal $\beta$. This means that in each of these groups triggers B, C and G operate and triggers A, D, E and F assume the normal state.

(Z*b*) Repetition device HHZ is put in a state which is characteristic of the fourth turn or step of the repetition cycle.

(Z*c*) Both master and slave triggers M and SL are restored to normal.

In the receiver (FIGS. 4 and 7):

(O*a*) The distributor is put in the state which is characteristic of the seventh unit of time of a signal interval, cycle or turn. This means that the distributor trigger OVD is put in the operating state, the distributor triggers OVA, OVB and OVC assuming the normal state via conductor from the tape feeding trigger ST.

(O*b*) The repetition device HHO is put in the state corresponding with the fourth turn or step of the repetition cycle via conductor from the second test trigger STS in the Start and Restart circuit, (O*c*) The system cycle polarity triggers OPA and OPB, are put in the state which is characteristic of the second step or turn of the system cycle. This means that triggers OPA and OPB are restored to normal (see FIG. 8).

(O*d*) The restoring trigger STI is restored to normal.

(O*e*) System cycle position trigger STO operates.

(O*f*) Special signal "I" detecting trigger SIO is restored to normal.

When these switching actions have been carried out, pulse generator T8 in the correcting device of FIG. 9 and the pulse generating 400 cycles per second triggers, T4S, T4M, and 200 cycles per second triggers OT200 and ZT200 controlled by the trigger T8 will be instigated and operate in a manner to be described later on in connection with FIG. 9. In the transmitter, the pulse generator trigger ZT200 and the triggers ZT100 and ZT50 connected to it are caused to operate via one of the conductors G and H. The transmitter distributor triggers ZVA to ZVG operate too, so that trigger K will scan the memory triggers AI to GI. Thus trigger K (FIG. 5) would key out the idle time signal $\beta$ to the output trigger U, but, due to the normal states of triggers SL and M (condition Z*c* above), a blocking voltage is passed via gate 336 to trigger U, so that the latter becomes irresponsive to the keyed signal. The output trigger U thus remains at normal and no signal is transmitted; so that output terminal B exhibits spacing polarity.

As in the fourth period or step of the repetition cycle, the repetition device HHZ is blocked (Z*b*), no pulses ZP2, ZP3 and ZP4 from the transmitter in FIG. 5 will appear. Nor will the tape feeding trigger ST send transport pulses to the tape transmitter.

In the receiver in FIG. 7, the operation of the trigger reset trigger STA causes via special signal "I" restarting trigger STI, the suppression of pulse OP3. The fact is that gate 410 can only become conducting, if trigger STI has operated. As mentioned above in condition O*d*, the trigger STI is at normal and pulses OP3, including pulses P4 and P5 derived from them, do not appear.

The scanning for the printer relay PR is suppressed since gate 49 is blocked (O*b*). Second Test trigger STS is put in the operating condition via gate 431, which is conducting because the slave trigger SL is at normal condition (O*c*) above, as well as signal "I" restoring trigger STI (condition O*d* above) is normal. When after about 15 milliseconds the trigger reset trigger STA restores to normal, the following things happen:

In the transmitter:

The transmitter distributor ZVA to ZVG is normally controlled by P*v* pulses. There is no transmission, however, since output trigger U is blocked by slave and master triggers SL and M at normal condition (Z*c*).

The repetition device HHZ stops in the fourth period, as the control voltage for HHZ remains only at conductor A4. This will become apparent, when the receiver actions will be mentioned later.

Special signal "I" generator trigger ZSI in FIGS. 3 and 5 is caused to operate via conductor E, for this conductor is supplied with the output voltage of system cycle position trigger STO in FIGS. 4 and 7. This voltage causes the trigger generator ZSI to operate. Consequently, the scanner trigger K will incessantly key special "I" signals, which however are not transmitted due to the output trigger U being blocked.

The voltage at point E blocks gate 327*a*. This happens in cooperation with the voltage at the output terminal of trigger M at normal. Because gate 327*a* delivers a blocking voltage, gate 327 is blocked too. Consequently, neither pulses ZP1 nor pulses ZP1*a* can appear.

In the receiver:

As pulse OP4 does not appear, system cycle counter triggers OPA and OPB remain in the state which is characteristic for the second period of the system cycle.

Incoming signals are advanced through the information storage and delay line by means of pulses OP1, which are effective.

II–1. SIMULTANEOUS STARTS

If two stations should call each other simultaneously, both stations have been switched in the preparatory master condition. So both stations transmit signals "I" as calling and start signals. Neither station can start its receiver, however, because both stations expect in answer to a series of signals "I" transmitted a normal repetition cycle consisting of the following signals: "I, $\beta$, $\beta$, $\beta$."

So in both stations the same things occur and the further working will be described for one station.

On reception of the first unmutilated signal "I," signal "I" trigger STI operates in the manner described in connection with the initial start. The next singal "I" causes the trigger SIO to operate, but gate 427 will not become conducting, because trigger M is in the operative state. Consequently, the system cycle position trigger STO is not restored to normal either.

Instead of this, gate 440 to input of Preset trigger STA becomes conducting, because trigger SL is at normal (SL ($r$)), trigger M is operative, triggers STI and SIO are operative, and contact $q$ (Q) of the tape transmitter is closed. Trigger STA now operates and the condition thus attained is identical to the condition obtained when the apparatus is switched in. As distinct from the switching-in condition, however, trigger STA remains in the operative state. Thus an alarm can be switched in, to indicate to the operator at each station that action must be taken, such as manually opening and closing the $q$ contacts again which very unlikely could happen within a few milliseconds of being simultaneous again. Thus trigger STA can be restored to normal again, when the $q$-contact of the tape transmitter is opened again, or when the voltage supply is switched off and then switched on again. Then a new call can be made since the probability of another simultaneous call is very small, but if it does occur, this manual action is again repeated at each station.

III. TRANSMITTER

(1) *Pulse Generator and Distributor*

Now, due to both triggers SL being in the operating condition, the transmission of the series of signals "I" has not the result described above for the case of simultaneous initial calls.

Further a one-channel 50 bauds system is described, having a repetition cycle of four signals and a seven-units constant-ratio code. In the transmitter (FIGS. 3, 5 and 6) a sevenfold trigger distributor ZVA, ZVB, ZVC, ZVD, ZVE, ZVF, ZVG (graphs 2 to 8) is controlled by a controlling pulse P$v$ (graph 1). This pulse P$v$, which appears every 20 msec. is derived via the dividing pulse generator triggers ZT50 and ZT100 from trigger ZT200, which delivers a voltage having a rectangular waveform and a frequency of 200 c./s. (see FIG. 6$a$). In the interval in which trigger ZVG operates, the seventh unit of time, the following pulses appear: ZP1 and ZP2 immediately at the beginning of the unit of time (see FIG. 6$a$ curves 9 and 10), so as to be practically together with pulse P$v$. At this moment, but only during the 2nd, 3rd and 4th turns of the repetition cycle (lines 19 and 20) there appears also a pulse ZP1A (curve 11). Pulse ZP1 is the advancing pulse. This means that in a shift register, the signal element information stored in memory trigger group I (AI to GI) is advanced by means of pulse ZP1 to memory trigger group II (AII to GII), the information stored in group II being advanced to memory trigger group III (AIII to GIII).

Signals can only pass from tape transmitter PZ to storing triggers BI to FI, if tape operated switch contacts ($q$) in the tape transmitter is closed. This switch $q$ applies a voltage from battery line common to contacts $e1$–$e5$ via contact $q$ to gating circuit 324, which is conducting, if the repetition device does not operate (HHZ4 being at normal under the control of repetition device HHZ which is active during the repetition cycle) and the distributor trigger ZVA operates (first element).

If gate 324 is conducting on the condition as mentioned above, idle time trigger IT will operate, as a result of which gates 31, 32, 33, 34 and 35 are controlled to become responsive. In this state of idle time trigger IT, gating circuit 36 is blocking. At the same time gates 37, 38, 39 and 30 become blocking too: gates 37 and 38 due to the blocking voltage supplied by trigger IT in the operative state via switch SW in position α, and gates 39 and 30 due to the absence of a voltage. If switch SW is in position β the blocking voltage is applied to gates 39 and 30 and then gates 37 and 38 receiving no voltage. Trigger IT, when operative, applies also a voltage to gating circuit 325 via terminal IT1 to tape feeding trigger ST, which gate 325 can become conducting if there occur no repetitions and if the distributor trigger ZVA is operative. Then tape feeding trigger ST operates and energizes the neutral relay ST' (see curve 16 in FIG. 6). Contact $st$ of relay ST' then closes, establishing an energizing circuit for driving magnet TM (see curve 17) of the tape transmitter PZ, so that the tape is stepped forward.

III–2. TAPE READING AND CODE CONVERTING CIRCUITS

The information stored in the last-mentioned trigger group III then appears. Reset pulse ZP2, which appears together with ZP1 puts triggers AI to GI all in one and the normal state. Via gating circuits 31, 32, 33, 34 and 35 the element contacts $e1$ to $e5$ in the tape transmitter PZ may control triggers BI, CI, DI, EI and FI, respectively, to assume the operative state or not. Each of said gating circuits conductive of the element contact $e1$–$e5$ controlling it, if a start polarity element or an element contact $e1$–$e5$ is scanned, if the idle time trigger IT is at normal and if there appears a pulse ZP3 (curve 12). So after the ZP3-pulse or recording pulse is applied to the gates 31–35, which pulse appears immediately after pulse ZP2, the states of first group I of memory triggers BI to FI record the five units of the scanned signal from the tape transmitter PZ. Pulse ZP4 (the code pulse) appears immediately after the disappearance of pulse ZP3 (curve 13). The output voltages of triggers BI to FI are converted in the code convertor ZCV in FIGS. 3 and 5 into control voltages, which, under the control of pulse ZP4, causes to change-over those triggers of group I, which are not in the states characteristic for the relevant signal in the seven-units code.

III–3. THE SCANNER AND INVERTER

(*System Cycle Counter*)

The output voltages of triggers AI to GI are successively transmitted via gating circuits 311 to 317 and gating circuit 318 to the keying trigger K under the control of timing pulses ZVA to ZVG (lines 2 to 9 in FIG. 6) from the distributor (ZVA to ZVG FIGS. 3 and 5). These pulses occur at the beginning of the operating periods initiated by them of the relevant trigger, as is indicated by vertical strokes on the dashes ZVA–ZVG in FIG. 6. The gating circuit 318 is conducting, when special signal "I" trigger ZSI is at normal under control of repetition device HHZ which is operative during the repetition cycle. Thus trigger K keys the seven-units signal in time sequence and supplies it to the output trigger U, via gating circuit 322, if a normal signal is wanted, or via gating circuit 323 if an inverted signal is wanted. Triggers ZPA and ZPB constitute a counting circuit capable of counting till four and thus marking four signals transmitted from the transmitter. First counting trigger ZPA is operative for one turn, switched to normal for the next, then again operative, etc., while the second counting trigger ZPB changes its state every two turns (see curves 14 and 15 in FIG. 6). If now, trigger ZPB is at normal under the control of the distributor trigger ZVA via ZPA, gating circuit 322 is conducting, as a result of which trigger U is so controlled, that the outgoing circuit B is keyed normal. If trigger ZPB is operative, however, the gating circuit 323 is conducting, and trigger U delivers the signal inverted.

III–4. IDLE TIME SIGNAL GENERATION

If there is no text to be transmitted, switch $q$ in the tape transmitter PZ is opened. When switch $q$ opens, the idle time trigger IT assumes the normal position under the control of gating circuit 324, which is only conducting, when the repetition device does not operate, at the beginning of the first distributor period.

Because the idle time trigger IT restores to normal via now open contact $q$, a condition voltage supplied so far to gating circuits 31 to 35 is taken away, as a result of which trigger BI to FI are no longer controlled by the tape code. A voltage is applied to by trigger IT, gate 36, however, and this voltage is also applied to gating circuits 37 and 38 in the case of the transmission of idle time signal $a$ and to gating circuits 39 and 30 in the case of the transmission of idle time signal $\beta$. In the case of a signal $\alpha$ triggers BI, AI and FI operate under the control of a pulse ZP3 since circuits 36, 37, and 38 are connected with triggers BI, AI and FI and also the switch SW in position $\alpha$ shown in FIG. 5. If a signal $\beta$ is to be transmitted, the pulse line ZP3 is connected from block ZP3 to line ZP3 (top FIG. 5) connected with and to cause triggers BI, CI and GI to operate via gates 36, 39 and 30. Pulse ZP4 is connected from block ZP4 to line ZP4 at top of code converter ZCV in FIG. 5, which controls the coding, does not appear when an idle time signal is transmitted. In that case the conditional voltage originating from terminal 1 of the operative trigger IT has been taken away from gating circuit 326 initiating trigger ZP4 for this pulse. So when scanned, trigger group I exhibits a combination of states as was formed when pulse ZP3 appeared and, consequently, trigger K keys the output circuit with an idle time signal $\alpha$: x x o o o x o, or with an idle time signal $\beta$: o x x o o o x, x representing start polarity and o stop polarity.

III–5. REPETITION DEVICE

If the reptition device HHZ has to operate, which is naturally determined by the associated receiver circuit in FIGS. 5 and 7 in connection with the reception of either a signal not exhibiting the three-four mark-space element ratio, or the inquiry signal "I": o x o x x o o, then the repetition device HHZ receives control voltages A1, A3 and A4 from the receiver circuit in FIGS. 5 and 7, as a result of which it operates under the control of the seventh step of the transmitter distributor ZVG, mark four signals, cycles or turns and then restores to normal again. Output terminal HHZ1 marks the first of the four turns, output terminal HHZ3 marks the second, the third and the fourth, and output HHZ4 all of them (see curves 19, 20 and 21 in FIG. 6).

During the first turn of a repetition cycle:

(*a*) Pulse and trigger ZP1 is suppressed by gating circuit 327, and (*b*) Trigger ZSI is caused to operate by gating circuit 330 to generate signal "I".

During the second, the third and the fourth turns of the repetition cycle:

(*c*) Gating circuit 329 becomes conducting, so that pulses ZP1 can control trigger ZP1A and, consequently, pulses ZP1A are generated (see curve 27 in FIG. 6), and (*d*) Gating circuit 331 becomes conducting, so that ZSI can continue to operate and generate signals "I", if the required control voltage is present at conductor F from the correcting circuit and if seventh distributor trigger ZVG is operative (see curve 28 in FIG. 6).

During the entire repetition cycle:

(*e*) Gating circuit 325 is blocked, so that tape feeding trigger ST pulses are no longer generated (see curve 22 in FIG. 6) and the tape transmitter stops, (*f*) Gating circuit 324 is blocked, so that trigger IT cannot assume another state, and there is no more scanning of the tape and idle time signals can only be produced, and (*g*) Gating circuit 328 is blocked and pulses ZP2 are suppressed, so that no more resetting of register A1–G1 occurs (curve 24, see FIG. 6). At the same time pulses ZP3 and ZP4 are suppressed (curves 25 and 26 in FIG. 6), so no more tape or idle time pulses are scanned and no code conversion occurs.

The procedure during the repetition cycle may be summarized as follows:

During the first turn trigger ZSI is in the operative state and gating circuit 318 is blocked by the blocking voltage delivered by it. The control voltage from ZSI renders gating circuits 319, 320 and 321 conducting, notably gate 319 for the operating period of ZVB, gate 320 for the operating period of ZVB and gate 321 for the operating period of ZVE. Under these circumstances trigger K is controlled according to the pattern: o x o x x o o, being the signal "I." If the repetition cycle was initiated by the reception of a multilated signal, conductor F (opposite polarity of S) is provided with a control voltage, so that trigger ZSI behaves according to curve 28 in FIG. 6 and, consequently, is operative for all of the four turns of the cycle, thus a signal "I'" is transmitted four times on end.

On arrival of a signal "I," however, the voltage at conductor S is always a blocking voltage, so that after the reception of a signal "I" trigger ZSI cannot be put in the operating state via gating circuit 331. So in that case a signal "I" will only be transmitted in the first turn. If in a repetition cycle occasioned by the reception of a mutilated signal "a" signal "I" is received, the control voltage will be taken away from S, so that there is no further transmission of signal "I," From then on trigger K is keyed via gating circuit 318 again.

As the pulse ZP1A occur during the second, the third and the fourth steps of the repetition cycle, the information contained in triggers AIII to GIII will be shifted to triggers AI to GI in these three steps too.

As neither ZP2, nor ZP3, nor ZP4 appear (see curves 24, 25 and 26 in FIG. 6), triggers A–I to G–I do not restore to normal, the tape code is not recorded and there is no coding during the repetition.

IV. RECEIVER

(*1*) *Pulse Generator and Distributor*

The voice frequency signal arriving from the radio receiver is applied to amplifier V (FIG. 9) and, after being amplified, rectified and applied by way of a control voltage to trigger T.

If the radio signal is already a D.C. signal, it is sent direct to trigger T. So this trigger renders the radio signal received in a defined D.C. voltage which is applied via conductor IN to the receiver with a view to the control of gates 41 and 42.

In the receiver (FIGS. 4, 7 and 8) triggers OVA, OVB, OVC and OVD constitute a distributor circuit having seven criteria (curves 2, 3, 4 and 5 in FIG. 8).

The distributor is controlled by pulses PO1, which appear every 20 ms.

Trigger OT200 in FIGS. 5 and 7 triggers at a frequency of 200 c./s. Trigger OT100 delivers half that frequency. This trigger controls in its turn a frequency halving trigger OT50, which consequently, delivers alternatively via capacitors C1 and C2, pulses of opposite polarities alternating at intervals of 10 ms., the positive pulses, which thus appear every 20 ms., only being effective.

The capacitor C1 pulse controls a pulse trigger OP1, which consequently, delivers a pulse every 20 ms. (curve 1 in FIG. 8). Trigger OP1 controls inter alia a trigger OP2 (curve 6 in FIG. 8), which in its turn delivers a pulse every 20 ms. These latter pulses, however, appear with some delay with respect to the OP1 pulses.

A third pulse trigger OP3 is excited by the trigger OP2 pulses via gating circuit 410. This gate is conducting, when the distributor trigger OVD (curve 5 in FIG. 8) is active in the seventh distributor interval (curve 7 in FIG. 8).

Pulses from trigger OP3 control the pulse trigger OP4, but only if special signal "I" trigger STI operates, rendering gating circuit 410 conducting. Pulses OP4 appears with some delay after the OP3 pulses (curve 8 in FIG. 8).

Pulse trigger OP5 (curve 9 in FIG. 8) is activated by the disappearance of the trigger OP4 pulses, unless the repetition device HHO is operative. In that case gating circuit 411 is blocked for the duration of the four steps of the repetition cycle.

IV–2. INVERTER AND RECEIVING CIRCUITS

System cycle counting trigger OPA is so controlled by pulses OP4, that it alternately operates and restores to normal at successive steps of the distributor (curve 11 in FIG. 8).

System cycle counting trigger OPB is controlled by trigger OP4 pulses too, but in such a way that it is alternately operative and at normal for two distributor steps. When at normal OPB supplies gating circuit 41 with a voltage causing it to become conducting, whereas the voltage delivered by OPB to gate 42 blocks this gate.

The incoming regenerated D.C. signal IN is led to gates 41 and 42. If the voltage reaches trigger OG via gate 41, the signal is stored normal. If gate 42 is conducting, however, trigger OG is so controlled by the input signal IN that the signal is stored inverted.

It appears from the above that for two steps trigger OG passes the incoming signal with inverted polarities to the information storage and delay line or shift register consisting of triggers OA, OB, OC, OD, OE, OF and OG itself. In this delay line or shift register the information is advanced every time by the OP1 pulses. Pulses OP1 also control gates 41 and 42. At every OP1 pulse the information contained in trigger OG is transferred via gate 43 to trigger OF. In like manner the information stored in trigger OF passes via gate 44 to trigger OE. The information stored in trigger OE passes via gate 45 to trigger OD, the information stored in trigger OD passes via gate 46 to trigger OC, the information stored in trigger OC passes via gate 47 to trigger OB, and finally the information stored in trigger OB passes via gate 48 to trigger OA, which, if desired, may control the printing trigger PR via gate 49. Every 20 milliseconds the signal received is advanced every time by the OP1 pulses. Pulses OP1 wards trigger OA, so that after seven pulses triggers OA to OG have taken the states characteristic for the signal just received.

IV–3. CONVERTER AND PRINTING CIRCUITS

If it is assumed that this signal is the letter "T," and this signal "T" is transmitted normally, it will consist of the following elements: x o x o x o o; "x" representing a start polarity element and "o" a stop polarity element. Pulse OP5, which only appears in the seventh interval, causes the code converter OCV, after seven pulses OP1, to form from the output voltages of triggers OA to OG the five-units pattern corresponding to the letter "T." This conversion controls the triggers OA to OG so that trigger OA always assumes the spacing condition; triggers OB, OC, OD, OE and OF assume states as determined by the 1st, the 2nd, the 3rd, the 4th and the 5th elements, respectively, of the five-units signal, and trigger OG always assumes the marking condition.

Then pulse OP6 causes the printing trigger PR to take on the state of trigger OA, on the assumption that gate 49 is conducting.

On reception of a "T" triggers OA to OG assume at the code converting pulse OP5, the following states, respectively: spacing, spacing, spacing, spacing, spacing, marking, marking.

Further OP1 pulses rule the successive recording of the elements of the next seven-units signal on trigger OG, but it is the five-units signal, provided with a start element (OA in the spacing state) and a stop element (OG in the marking state) which are thereby pushed out of the shift register and pass trigger OA. This trigger OA is thus successively scanned by means of pulses OP6, so that the printing trigger PR keys the start-stop signal and controls a polarized relay PR, which, by means of contact *pr*, provides a keying circuit for a line or a code printer.

IV–4. ERROR DETECTION

Determining whether a received signal is correct or not is done by counting the number of spacing elements the signal contains. So a spacing counter RT counts the number of times trigger OG is at normal. This counting is done under the control of pulses OP2, via gating circuit 417. Every seventh element interval, counter RT is restored to normal under the control of a pulse OP6 via gating circuit 418, and then the number of spacing elements in the next seven elements is determined and recorded by the counter RT.

If a signal has been received correctly, four spacing elements are counted. In that case counter RT delivers at its output terminal RT2 a voltage which constitutes the condition for gates 413, 415 and 416 to become conducting. At the same time a blocking voltage appears at the other output terminal RT1 of counter causing gates 414 and 419 to be non-conducting.

If however, counter RT has recorded more or less than four spacing elements, such as in the case of a mutilated signal being received, the voltages at the output terminals RT1 and RT2 of counter RT are reversed. Thus gates 413, 414 and 416 are blocked, and gates 414 and 419 become conducting.

IV–5. REPETITIVE DEVICE

If after the seventh pulse OP2 or OP1, the spacing element counter RT has not yet recorded four spacing elements, gate 414 becomes conducting under the control of a pulse OP3, as a result of which triger SIO is restored to normal.

Under the control of a pulse OP4, gate 419 becomes conducting too, as a result of which the repetition device HHO is started. Once started, the repetition device marks four turns or steps consisting of the repetition cycle. Output terminal HHO1 delivers a blocking voltage during the first turn or step of the repetition cycle, output terminal HHO3 during the second, the third and the fourth turns or steps and output termianl HHO4 during all four of them. These voltages are supplied to the transmitter via conductors A1, A3 and A4, respectively. The blocking voltage provided by HHO4 blocks also gate 49 to the printing trigger PR, so that for four turns or steps of the repetition cycle no signal is printed. Besides, gate 411 is blocked, so that no converting pulses OP5 appear for the duration of the repetition cycle.

On reception of a signal "I," triggers OB, OD and OE of the information storage and delay line or shift register operate. If this signal "I" is not mutilated, error detector counter RT is in the state it occupies when it has counted four spacing elements. Consequently gate 413 is conducting when the pulse OP3 appears. Trigger SIO is caused to operate. The same conditions of triggers OB, OD and OE having operated, cause gate 421 to become conducting under the control of a pulse OP4, which entails the start of repetition device HHO, like in the case of the reception of a mutilated signal, since the reception of a signal "I" means that a reeptition is asked for, so that the repetition device has to operate.

If the repetition device has been started by a signal received mutilated, trigger SIO is restored to normal. In that case the output terminal of trigger SIO has a potential which renders gate circuit 420 conducting. The result of this will be that, if the repetition cycle is over, the repetition cycle will start again, if no signal "I" has been received during that cycle. This goes on until during a cycle a signal "I" is properly received and recorded, as a result of which trigger SIO can operate to stop the repetition cycle.

If trigger SIO is at normal, the voltage appearing at its output terminal SIO will make gate 331 in the transmitter (see FIG. 5) conducting via conductor S. Thus, the transmitter goes on sending signals "I" as long as trigger SIO in the receiver has not operated.

If a non-mutilated idle time signal $\alpha$ is correctly received, triggers OA, OB, and OF of the delay line or shift register are operative. Under these conditions and in the presence of a voltage at counter output terminal RT2, trigger A1, controlled by a pulse OP3, can operate. When operating, this trigger A1 applies a blocking voltage to gate 49, so that no signal can be printed.

Something similar happens on reception of a non-mutilated idle time signal $\beta$. In that case trigger B*e* operates, as conditioned, by the operative state of triggers OB, OC and OG existing on reception of a $\beta$ signal.

Immediately before the appearance of a pulse OP3, which does or does not cause triggers A1 or B*e* to operate, these two triggers are restored to normal via gating circuit 422. This happens in the seventh element or unit of time in a signal interval; trigger OVD being operative by the control pulse OP2.

Just like when trigger A1 is operative, trigger B*e* causes gate 49 to be non-conducting so that no signal is printed.

The repetition device, which is controlled by pulse OP4 from one period into the other, will always remain in the state characteristic of the fourth period, due to the non-appearance of OP4 pulses. Thus via conductor A4 the transmitting repetition device HHZ is controlled to stop in the fourth period too.

V. MASTER-SLAVE STATION RELATIONSHIP

In a connection one station must be a calling or the master station and the other the called or the slave station. Which of the stations is master or slave is determined every time a new connection is established. So either station may be arranged as master station or as slave station. For this purpose triggers M and SL have been provided in the transmitter at each station. These two triggers have four criteria: *a, b, c,* and *d,* according to the following table:

| | M | SL | |
|---|---|---|---|
| (*a*) | o | o | o indicating that the trigger is at normal, and x that it is operative. |
| (*b*) | x | o | |
| (*c*) | o | x | |
| (*d*) | x | x | |

(*a*) is the standby condition. It occurs when the power switch S has been switched in.

If one of the stations has a message, the *q*-contact in the tape transmitter is closed, this causes trigger M in this station to operate (condition *b* above). This condition is the preparatory master condition.

Trigger M can be caused to operate by gate 337, but only, if trigger SL is still at normal. Because in the station in which the *q*-contact of the tape transmitter has been closed (that is, called station A in what follows), trigger M has operated and thus the blocking by gate 336 has been taken away from output trigger U. Now this station transmits incessantly signals "I," as trigger ZSI is kept continually in the operating state by operative system cycle position trigger STO.

V-1. SYSTEM CYCLE SYNCHRONIZATION

The counter station, called station B, receives these signals at its input terminal IN and because its triggers OPA and OPB are in states corresponding with the second (i.e. normal) period of the system cycle, the first signal "I" transmitted normally is recorded in the information storage and delay line. In this case, supposing this signal "I" is received non-mutilated, then receiving triggers OB, OD and OE will be operative, and receiving triggers OA, OC, OF and OG will remain in their normal condition.

Now gate 25 causes the signal "I" trigger STI to operate, so that the blocking of pulses OP3 is removed.

The next signal to be recorded in the delay line or shift register has also been transmitted normally. This signal too is received normally or non-mutilated, as the system cycle counting trigger ZPA and ZPB are still blocked. Second test trigger STS is still operative, so that gate 412 is blocked. Due to the operation of special signal "I" trigger STI, the distributor OVA to OVD is unblocked, so that it can now start to mark the units of time controlled by the pulses OP1. When the distributor has accomplished a complete period, the next signal "I" has just been received in the delay line or shift register. If this second signal "I" has not been mutilated, detector trigger SIO, controlled by a pulse OP3, will operate.

Now the system cycle position trigger STO is restored to normal, due to the operation of detector trigger SIO, via gate 427, which gate is conducting when trigger M is at normal and trigger SL operates. At station B triggers M and SL are in condition (*a*), so M is in its normal condition.

Now that the system cycle position trigger STO has operated, trigger SL in the transmitter B has been caused to operate via conductor E. Now the trigger M/SL condition is as indicated at condition (*b* above), that is for a definitely called condition. Trigger M can no longer be caused to operate. Due to the position trigger STO being operative, the second test trigger STS is restored to normal via capacitor C3, due to which the station now functions normally as a called station and the system cycle is in progress (OPA, OPB). The pulse trigger OP 4 in the receiver is unblocked due to operation of trigger STI controlled by trigger STS.

In the transmitter of this station B a pulse is applied by the system cycle position trigger STO via conductor E to gating circuit 332 in its receiver (FIG. 5), which, on the condition that M is at normal (M (*r*)), becomes conducting and causes the monostable relaxation generator or distributor reset trigger RV to operate. Flip-flop RV remains in the operating state for a while and is restored to normal again after a predetermined time. If trigger RV is in the operating state, the transmitter distributor is put in the state corresponding with the seventh unit of time of the signal period, and counting triggers ZPA and ZPB in the state or step corresponding to the fourth state of the system cycle. The blocking of gate 336 is discontinued by SL in the operating state, so that at the next pulse PVA, output trigger U starts transmitting a normal repetition cycle consisting of the next signals: I, $\beta$, $\beta$, $\beta$, the "I" signal being transmitted in the first (normal) period of the system cycle.

The master station A receives in the second (normal) period of the system cycle the signal I transmitted by station B in the storage and delay line of its receiver AO. Consequently, just like at station B, trigger STI is put via gate 25 in the operating state by detection of signal "I," so is the receiving distributor released and the blocking of pulses OP3 is discontinued.

The next signal transmitted by the calling station A is a normal signal $\beta$, which, in the seventh state of the receiving distributor of the calling station is recognized as such by trigger B*e*, in consequence of which this trigger is caused to operate via gate 416.

Now trigger STO is restored to normal by gate 428, which becomes conducting, if M is operative and SL at normal. Trigger B*e* (A) on the other hand operates.

The system cycle position trigger STO having operated, all the functions in the receiver become normal, and, just like in the called station, trigger SL in the transmitter B is caused to operate via conductor E, triggers M and SL having thus reached condition (*b*), the definitive master station.

Special signal "I" generator trigger ZSI is released by conductor E, but the reset trigger RV does not operate, because gate 332 does not become conducting.

V-2. RESYNCHRONIZATION

When an interruption of traffic has lasted 10 seconds, it is assumed that synchronization does no longer exist. When the repetition device has been active for 10 seconds, a time constant circuit TC10 will, on the condition that position trigger STO is at normal, deliver a criterion which via gate 426 causes the system cycle position trigger STO to operate. This gating circuit 426, however, only becomes conducting, when OPA and OPB have reached the state which is characteristic of the second period of the system cycle. The said interval of 10 seconds is not exact and is determined by a time constant resistor-condenser circuit.

So at either station the system cycle position trigger STO will operate as determined by the local TC 10 time constant circuit.

In the master station A, where both triggers M and SL are operative, special signal "I" generator trigger ZSI operates due to the voltage provided via conductor E from the position trigger STO being operative.

Hence the station A transmitter starts transmitting a continuous series of signals "I." The receiver goes on functioning normally. Special signal "I" trigger STI does not restore to normal, because gate 430 is blocked by trigger M in the operating state. Thus the second test trigger STS cannot operate, and all the functions in the receiver are performed normally.

At slave station B, where trigger M is at normal and trigger SL is operative, special signal "I" generating trigger ZSI operates, as at station A, so that station B starts transmitting a continuous series of signals "I" too. In the receiver, however, trigger STI does become conducting, because trigger M in the transmitter is at normal (M*r*). So trigger STI is restored to normal by this circuit and the second test. Trigger STS is caused to operate via gate 432.

The condition existing now is identical to the condition obtaining after the switching-in of switch S, so that the receiver can start after having received two successive signals "I" having normal polarities. The only difference consists in that in the case of re-synchronization the repetition device may have been blocked in any state or step of the system cycle, whereas in the case of initial synchronization the repetition device is always in state or step 4 thereof.

When the receiver of station A has started in a way as described in connection with the call, the transmission of signal "I" is discontinued and replaced by the transmission of a normal signal or the repetition cycle whichever was interrupted, beginning with the period of the cycle, in which it was interrupted.

V–2C*a*. DURING REPETITION CYCLE

As before the re-start the receiving distributor was idle and the transmitting distributor was in normal operation, the correct phase relationship between the transmitter distributor and the receiving distributor must be re-established. At the same time the transmission must also be effected in the correct polarities. This is achieved by making the reset flip-flop RV operate for a moment, as has been described in connection with the start of the slave transmitter in the case of the initial start.

So the slave station transmits normal repetition cycles. Before proceeding to normal traffic the master station must have received all the four signals coming in during a cycle of the receiving repetition device correctly. Moreover, at least one of these signals must not be a signal "I." This condition has been made, because the reception of four unmutilated signals "I" during a cycle of the receiving repetition device indicates that the slave station has no correct reception as yet, or at least has not yet started.

Triggers X, Y and Z state whether the said condition is fulfilled. When a repetition device begins, trigger X is caused to operate too. If the spacing element counter RT finds a mutilated signal, trigger X restores to normal due to the voltage applied at RT1.

The trigger Y is put in the normal state by each pulse OP2 in the seventh element interval. On reception of a signal "I," a pulse is applied (at moment of pulse OP3) via gate 413 to trigger Y, which operates in consequence, however 20 ms as later trigger Y can restore to normal again.

If, however, no correct signal "I" has been received, the signal received may be either a signal other than signal "I" or a mutilated signal ("I" or some other signal). In either of these cases trigger Y operates. Trigger Z is caused to operate via gate 433. This gate is conducting, if at moment of pulse OP4 the trigger Y is at normal. This occurs whenever one of the said cases occurs. If, however, the received signal is mutilated, trigger X returns to its normal state.

If at the end of a cycle of the receiving repetition device HHO trigger X is operative, all the signals have been received correctly. If, moreover, trigger Z is operative, at least one of the four signals received is not a signal "I."

Then the system cycle position trigger STO returns to normal as controlled by gate 429, because all the conditions are fulfilled for this gate to become conducting: triggers SL and M have operated (criterion for the master station) and via conductor E trigger ZSI has been caused to operate too. So due to the operation of trigger STO trigger ZSI in the transmitter is released, so that the transmission is effected by the normal repetition cycle. Trigger RV is not caused to operate, because the control by the operative trigger M is blocked.

Now both stations are transmitting the respective repetition cycles, as a result of which a normally operating repetition circuit has been obtained again, having a synchronous system cycle.

VI. PHASE CORRECTING CIRCUIT

(*1*) *Slave Station Locked Distributors*

In the slave station the transmitting and the receiving distributors are coupled together in such a way that intervals of like numbers occur at the same time. This station receives correction.

The coupling of the distributors in effected by applying the voltage delivered by trigger OVD of the receiving distributor via conductor L to the associated transmitter. When trigger OVD operates this voltage causes, via gate 333 in the transmitter, the transmitting distributor to run in phase with the receiving distributor. These conditions of M being at normal and SL operative have been made to ensure that only in the station connected as slave station B said gate 333 becomes conducting and the transmitter and receiver distributors are locked together.

In the correcting part (FIG. 9) there may be two output triggers, T2M and T2S but these may be incorporated in the 200 s./c. trigger generators OT200 and ZT200 in the receiver and transmitter, respectively. As will appear in what follows both triggers key a frequency of 400 c./s. obtained by division from a local 800 c./s. generator T8. The two divisions occur independent of each other, trigger T4M being connected by a stiff coupling to the 800 c./s. generator, whereas T4S may be shifted in phase with respect to the 800 c./s. trigger T8.

This phase shift is determined by the shift of the edges of the signal received. Trigger T4M which, as has been mentioned has a stiff coupling to the 800 c./s. generator, is connected via conductor H to gating circuit 334 in the transmitter, whereas trigger T2S, which is capable of phase shifts, is connected by conductor G via gate 335 in the transmitter to trigger ZT200, and by a fixed connection to OT200 in the receiver.

If the station is connected as master station only gate 334 can become conducting, whereas in the station connected as slave station only gate 335 is conducting. Thus in the master station the transmitting distributor is controlled via conductor A by a frequency being in a fixed relation to the frequency of the 800 c./s. trigger, whereas in the slave station the distributor is controlled via conductor G by a trigger, the frequency of which is capable of varying with rsepect to the 800 c./s. trigger frequency.

The receiving distributors of the stations are controlled by their respective triggers T2S, because the voltage delivered by the latter trigger T2S controls, via conductor G, trigger OT200 in the receiver.

Thus in principle the calling station gives correction, i.e. the frequency of the 800 c./s. generator T8 in this station controls the go circuit and the return circuit. The called station or slave station in principle receive correction then, the correcting controls resulting in the readjustment of both the receiver and of the transmitting distributors at the same time or together, since in the called station there is always a fixed relation between the transmitting distributor and the receiving distributor. In the calling station the correction controls only result in a shift of the receiving distributor. So in this calling station A there is no fixed relation between the transmitting and the receiving distributors.

V1–2. CORRECTION

From the transitions from spacing to marking and conversely, pulses are derived, designated, respectively, by T1 and T2 from receiver input trigger T.

The pulses (curve 1 in FIG. 10) control triggers, A′, B′ and C′, which constitute a counting circuit having eight criteria. Starting from the situation as indicated by hatching in the diagram of FIG. 10, i.e. the situation in which all the triggers are at normal, this counting circuit is switched forward by one step, so that A′, B′ and C′ operate, at a pulse T1 or a pulse T2, if this pulse coincides with a positive period of trigger T5, which delivers a 50 c./s. oscillation. If a pulse T1 or T2 coincides with a negative period of trigger T5, the circuit is switched back by one step.

If starting from the said normal state there occur three successive pulses in the positive half period of trigger T5, the circuit takes the state marked S in FIG. 10. In this case trigger B′ is at normal, whereas triggers A′ and C′ are in the operative state. This criterion causes trigger D′ to operate. If, on the other hand there occur three successive pulses in the negative half period of T5, the circuit takes the state marked F′, which criterion causes trigger E′ to operate.

Trigger T5 is controlled by the 50 c./s. trigger T50 in the receiver via conductor K. If the leading edge of the signal occurs in the positive half period of the T5 trigger voltage the distributor is fast with respect to the signal received, whereas in the case of the leading edge occurring in the negative half period the distributor is slow with respect to the signal received. Now this gaining or losing of the distributor is not corrected per edge pulse, but after integration.

Suppose trigger D′ has operated, then gate 61 will operate in the seventh interval of the receiving distributor, if the voltage at conductor R allows this. The spacing element counter RT must have recorded an unmultilated signal then. Fast trigger F′ operates in consequence of gate 61 becoming conducting.

Triggers T4S and T4M are controlled by T8*a* pulses via the respective gating circuits 63 and 65. If trigger S′ is at normal, gate 63 is conducting, when there arrives a T8*a* pulse. Gate 65 is conducting, if either trigger S′ is at normal, or the repetition device HHO due to a control via conductor A1, or via conductor S from trigger SIO in the receiver. So this gate 65 blocks the pulse T8*a* if slow trigger S′ is off normal and the repetition device is operative, that is when a signal "I" having been received.

In the case of normal traffic the repetition device is at normal, so that trigger T4M is then always controlled by T8*a* pulses, irrespective of slow trigger S′ asking for correction or not.

If slow trigger S′ is operative, however, a pulse T8*a* is withheld from trigger T4S, because gate 63 is then blocked. The then following T8*b* pulse, occurring between two T8*a* pulses, causes the trigger S′ to be restored to normal. So the blocking of a pulse T8*a* means that the trigger T4S is delayed in phase with respect to trigger T4M and, consequently, with respect to the controlling trigger T8, notably for the duration of ¼ of a period of the 800 c./s. oscillation.

If due to slowness of the distributor, fast trigger F′ operates, gate 64 becomes conducting, so that after a T8*a* pulse a T8*b* pulse will control trigger T4S too. Consequently, thus the distributor coupled to this trigger T4S has made a gaining phase step.

Gate 66 can only become correcting under the conditions causing the blocking of gate 65, on the understanding that fast trigger F′ must be operative instead of slow trigger S′.

Every time gate 63 becomes conducting or gate 64 blocking, triggers A′, B′, and C′ are set back into their normal states, which is the zero state of the counting circuit.

If now triggers A′, B′, and C′ are at normal, gating circuit 67 becomes conducting, thereby causing trigger D′ or trigger E′ to return to the normal state. Now all the triggers determining the correction are in the initial state again.

So in the case of a fast signal trigger F′ operates, whereas in the case of a slow signal trigger S′, operates, these operations cause, respectively, a (Fast) correction step giving the distributor a momentary acceleration, or a (Slow) correction step giving the distributor a momentary retardation to be performed.

In the slave station B both the transmitting trigger and the receiving trigger depend on trigger T4S, so that the behaviour of trigger T4M is irrelevant.

It is relevant, however, in the master station A. Here the transmitter distributor depends on T4M.

If now a repetition cycle is initiated in the master station A (the cause of the repetition being the reception of a signal "I" due to the slave station having received a faulty signal) no correction takes place at this slave station B.

Now at the master station A the correction is temporarily carried out as in a slave station B. Then triggers T4M and T4S are shifted in phase together. Thus in such a case the master station A will try to keep the transmitting distributor as well as the receiving distributor in phase with the signal received from the slave station B during such a repetition cycle.

So the operative state of the system cycle position trigger STO means that the relevant station is in the resynchronization condition. At the end of this period gate 429 and 427 restore position trigger STO to normal, notably in the master station A and in the slave station B, resp. At the master station A, the gate 428 operates to the reception of a signal $\beta$ in the case of the initial start.

We claim:

1. In an automatic error correcting telecommunication system having at least two stations each station having a transmitter and receiver and each transmitter and receiver having an input circuit, a memory circuit connected to and controlled by its said input circuit, a distributor circuit controlling its said memory circuit, a repetition device connected and controlled by its said distributor circuit to produce a predetermined number of signals in a repetition cycle, and an output circuit, and each said receiver also having an error detector circuit connected between its said memory circuit and its said repetition device, the improvement comprising: means for establishing and maintaining synchronism between the signals of the transmitter at one station with the receiver at another station, said means comprising: means in each transmitter connected to its said distributor circuit for giving an indication to each transmitted one of a given sequence of signals in a system cycle group corresponding to its position in a pattern in said group, the number of signals in said group being proportional to the number of signals in a repetition cycle, means at each receiver connected to its memory circuit for reproducing said indications, and means at each receiver connected to said error detector circuit for stopping and then restarting said reproducing means for insuring that the received signals are established and maintained in the same sequence and in the same order and same system cycle pattern in said group in which they were transmitted regardless of any interruptions or repetitions of said signals.

2. A system according to claim 1 wherein said memory circuit in said transmitter comprises means for storing one less than the number of signals in said repetition cycle.

3. A system according to claim 1 wherein each transmitter circuit includes a circuit for generating a special signal connected to and controlled by its said repetition device.

4. A system according to claim 3 wherein each receiver includes a circuit for detecting said special signal connected to its said memory circuit, its said distributor circuit, and its said error detector circuit.

5. A system according to claim 3 wherein said means in each receiver circuit for stopping and restarting said reproducing means includes a plurality of circuits for testing for said special signal for controlling the synchronous starting of that receiver.

6. A system according to claim 3 wherein said means in each receiver for stopping and restarting said reproducing means includes a locking circuit connected to said error detector circuit and said special signal detecting circuit for locking its system cycle in synchronism with that of its associated transmitter at the same station when a special signal is received requesting a repetition, and for maintaining said system cycle synchronism until after the requested repetition has been correctly received.

7. A system according to claim 6 wherein said locking circuit includes a delay device connected thereto for stopping said distributor of said associated receiver and for stopping said reproducing means when only mutilated signals have been received for longer than a given period of time.

8. A system according to claim 7 wherein each transmitter includes a master and slave control circuit to control which station is to be a master station.

9. A system according to claim 8 wherein said locking circuit at a master station includes means controlled by said delay device to operate said special signal generating circuit to continue to transmit special signals.

10. A system according to claim 4 wherein said means for stopping and restarting said reproducing means includes means connected to and controlled by said special signal detecting circuit.

11. A system according to claim 8 wherein said locking circuit at a slave station includes means to lock said reproducing means in its associated receiver to fix the phase between the system cycle and the repetition cycle before and after any repetition.

12. A system according to claim 1 wherein said signals are composed of mark and space elements in a predetermined constant ratio.

13. A system according to claim 12 wherein said means for giving said indication pattern to the signals in a system cycle group comprises means for inverting the elements in pre-determined ones of said signals in said group, and said means for reproducing said indications comprises means for reconverting said inverted signals in each said group.

14. A system according to claim 13 wherein said inverting means in each said transmitter includes gating circuits connected to its associated said output circuit.

15. A system according to claim 14 wherein said system cycle comprises four signals, and wherein there are two said gating circuits, one of said two gating circuits being for the inverted two of said four signals.

16. A system according to claim 1 wherein each transmitter includes a master and slave control circuit connected to said distributor to control which station is to be a master station and which station is to be a slave station depending upon which station is the first to make a call.

17. A system according to claim 16 including means at each station connected to its said master and slave control circuit for indicating if two stations of said system have started a call simultaneously so as to insure that only one station at a time will be considered a master station in said system.

18. A system according to claim 16 wherein said master and slave control circuit comprises a master trigger, a slave trigger, and a communication starting switch means which upon operation triggers said master trigger and prevents said slave trigger from operating until a signal is received back from the other and called station.

19. A system according to claim 16 including a pulse generator in each said transmitter connected to and controlled by said master and slave control circuit and connected to and controlling its associated said distributor circuit.

20. A system according to claim 1 wherein said repetition devices in the receiver and the transmitter at the same station are connected together.

21. A system according to claim 1 wherein each distributor includes and is controlled by a pulse generator.

22. A system according to claim 21 wherein each station includes a phase correcting circuit connected to said pulse generators of both said transmitter and receiver at that station.

23. A system according to claim 22 wherein said correcting circuit comprises a counter circuit connected to said input circuit of its said receiver, a memory device connected to said counter circuit, and pulse generator circuits connected to said memory device.

24. A system according to claim 1 wherein said signals are multi-element signals, wherein said distributor circuit steps for each element of each signal make one rotation for each signal, and wherein said indication giving means comprises a counting circuit controlled by the first step of said distributor circuit each rotaton thereof.

25. A system according to claim 24 wherein said system cycle comprises four signals and said counting circuit is responsive to four rotations of said distributor circuit.

26. A system according to claim 1 wherein said reproducing means includes a signal counting circuit.

27. A system according to claim 26 wherein said system cycle comprises a group of four signals, and wherein two adjacent signals in said group have an inverted polarity to the other two signals in said group.

28. A system according to claim 27 wherein said means for stopping and starting said reproducing means includes means for detecting the repetition of two consecutive signals of a given polarity, and means for starting said counting circuit in response to said detecting means.

29. A system according to claim 28 wherein said error detector circuit includes means responsive to a special signal for operating said starting means.

30. A system according to claim 29 wherein said means for stopping and restarting said reproducing means includes means controlled by its associated repetition device and said error detector circuit for preventing the operation of said detecting means by reception of an erroneous special signal for starting.

31. A system according to claim 27 wherein said input circuit in each receiver includes two gating means between it and its associated memory circuit, said gating means being connected to and controlled by its associated said distributor circuit and said signal counting circuit for distinguishing between the signals of different polarities in each group.

32. A system according to claim 1 wherein said means for stopping and restarting said reproducing means includes means connected to its associated said repetition device for establishing and maintaining the same phase relationship between the repetition cycle and the system cycle before and after any repetition.

33. In an automatic error correcting synchronous telecommunication system having at least two stations, each station having a transmitter and a receiver and each transmitter and receiver having a memory circuit, a distributor circuit controlling its said memory circuit, and a repetition device connected to and controlled by its said distributor circuit to produce a predetermined number of signals in a repetition cycle, each said receiver also having an error detector circuit connected between its said memory circuit and its said repetition device, the improvement comprising: means for establishing and maintaining synchronism between the signals of the transmitter at one station with the receiver at another station, said means comprising: means in each transmitter connected to its said distributor circuit for giving an indication to each transmitted one of a given sequence of signals in a pattern in a system cycle group corresponding to its position in said group, the number of signals in said group being a whole integer times the number of signals in said repetition cycle, means at each receiver connected to its said memory circuit for reproducing said indications, and means at each receiver connected between said memory circuit and said reproducing means for detecting said pattern of signals in said system cycle and operating said repetition devices until a predetermined synchronism of said system cycle pattern of signals is received.

34. A system accordng to claim 33 wherein said indication giving means in each transmitter includes a counter circuit for counting the number of signals in said system cycle.

35. A system according to claim 33 wherein said reproducing means in each receiver includes a counter circuit for counting the number of signals in each system cycle.

36. A system according to claim 33 wherein the number of signals in the system cycle equals the number of signals in the repetition cycle.

37. A system according to claim 33 wherein said means for detecting said pattern of signals in the system cycle includes a plurality fo testers corresponding to the number of signals in a given pattern of signals in said system cycle.

38. A system according to claim 33 wherein said means for detecting said pattern of signals includes means for starting its associated receiver when it is in synchronism with the signals received from a remote transmitter.

39. A system according to claim 33 wherein said means for detecting said pattern of signals includes means for locking its associated said receiver according to said pattern independently of any interruptions in the communication between it and its communicating remote station.

40. A system according to claim 33 wherein said means for detecting said pattern of signals includes a time delaying means for stopping its associated said receiver after an interruption in communication for a predetermined period of time and then restarting said receiver when unmutilated signals in proper synchronism are again received.

41. A system according to claim 33 including a master and slave circuit control means in each transmitter for determining which station will be the master station and which station will be the slave station depending upon which of the two stations is the first to start the communication.

References Cited in the file of this patent

UNITED STATES PATENTS

| | | |
|---|---|---|
| 2,706,215 | Van Duuren | Apr. 12, 1955 |
| 2,805,278 | Van Duuren | Sept. 3, 1957 |
| 2,903,514 | Van Duuren | Sept. 8, 1959 |
| 2,914,612 | Davey et al. | Nov. 24, 1959 |
| 2,934,604 | Bizet | Apr. 26, 1960 |